United States Patent
Ihm et al.

(10) Patent No.: US 7,995,664 B2
(45) Date of Patent: Aug. 9, 2011

(54) METHOD AND APPARATUS FOR TRANSMITTING PILOT SYMBOLS IN WIRELESS COMMUNICATION SYSTEM

(75) Inventors: Bin Chul Ihm, Gyeonggi-do (KR); Moon Il Lee, Gyeonggi-do (KR); Jin Young Chun, Seoul (KR); Wook Bong Lee, Gyeonggi-do (KR); Jae Won Chang, Gyeonggi-do (KR); Jin Hyuk Jung, Gyeonggi-do (KR); Jae Wan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 634 days.

(21) Appl. No.: 11/995,675

(22) PCT Filed: Jul. 14, 2006

(86) PCT No.: PCT/KR2006/002784
§ 371 (c)(1),
(2), (4) Date: Aug. 8, 2008

(87) PCT Pub. No.: WO2007/011138
PCT Pub. Date: Jan. 25, 2007

(65) Prior Publication Data
US 2009/0147868 A1    Jun. 11, 2009

Related U.S. Application Data

(60) Provisional application No. 60/782,547, filed on Mar. 14, 2006.

(30) Foreign Application Priority Data

Jul. 15, 2005 (KR) .................. 10-2005-0064427
Nov. 11, 2005 (KR) .................. 10-2005-0108039

(51) Int. Cl.
H04L 27/28    (2006.01)
H04J 11/00    (2006.01)

(52) U.S. Cl. .................................. 375/260; 370/208
(58) Field of Classification Search .............. 375/130, 375/259–261, 265–266, 285, 295, 298–299; 370/500, 503, 514–515
See application file for complete search history.

(56) References Cited

U.S. PATENT DOCUMENTS

| 6,519,237 | B1 * | 2/2003 | McDonough et al. | 370/335 |
| 6,804,264 | B1 * | 10/2004 | Song | 370/500 |
| 7,233,625 | B2 * | 6/2007 | Ma et al. | 375/260 |
| 2003/0072254 | A1 | 4/2003 | Ma et al. | |
| 2004/0131007 | A1 | 7/2004 | Smee et al. | |
| 2005/0094550 | A1 * | 5/2005 | Huh et al. | 370/203 |

FOREIGN PATENT DOCUMENTS

WO    2004/038988    5/2004

* cited by examiner

*Primary Examiner* — Khanh C Tran
(74) *Attorney, Agent, or Firm* — Lee, Hong, Degerman, Kang & Waimey

(57) ABSTRACT

A method of transmitting pilot symbols is disclosed. In a communication system performing communications using a plurality of antennas and multiple carriers, the present invention includes the steps of generating a plurality of pilot symbol sequences based on a basic code sequence, data-processing a plurality of the pilot symbol sequences by allocating each of a plurality of the pilot symbol sequences to the multiple carriers, and transmitting each of a plurality of the data-processed pilot symbol sequences via a corresponding one of a plurality of the antennas.

25 Claims, 22 Drawing Sheets

FIG. 6

Subcarrier index ⟶

| | 0 | 3 | 6 | 9 | 12 | 15 | 18 | 21 | ... |
|---|---|---|---|---|---|---|---|---|---|
| Antenna 0 | $x_0$ | $x_1^*$ | $x_2$ | $x_3^*$ | $x_4$ | $x_5^*$ | $x_6$ | $x_7^*$ | ... |
| Antenna 1 | $x_1$ | $-x_0^*$ | $x_3$ | $-x_2^*$ | $x_5$ | $-x_4^*$ | $x_7$ | $-x_6^*$ | ... |

FIG. 7
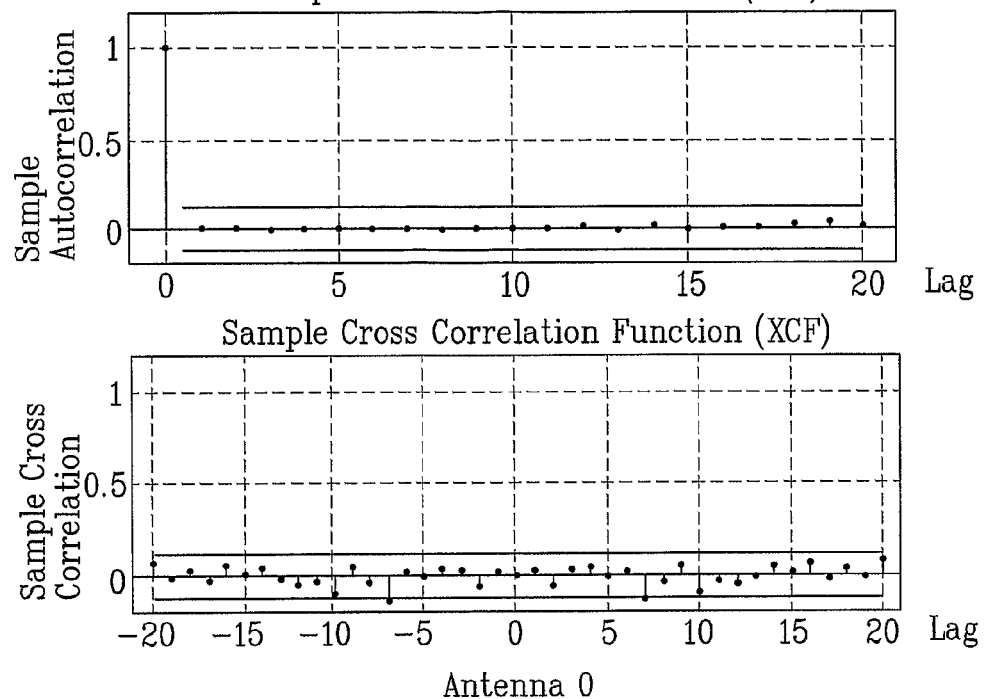
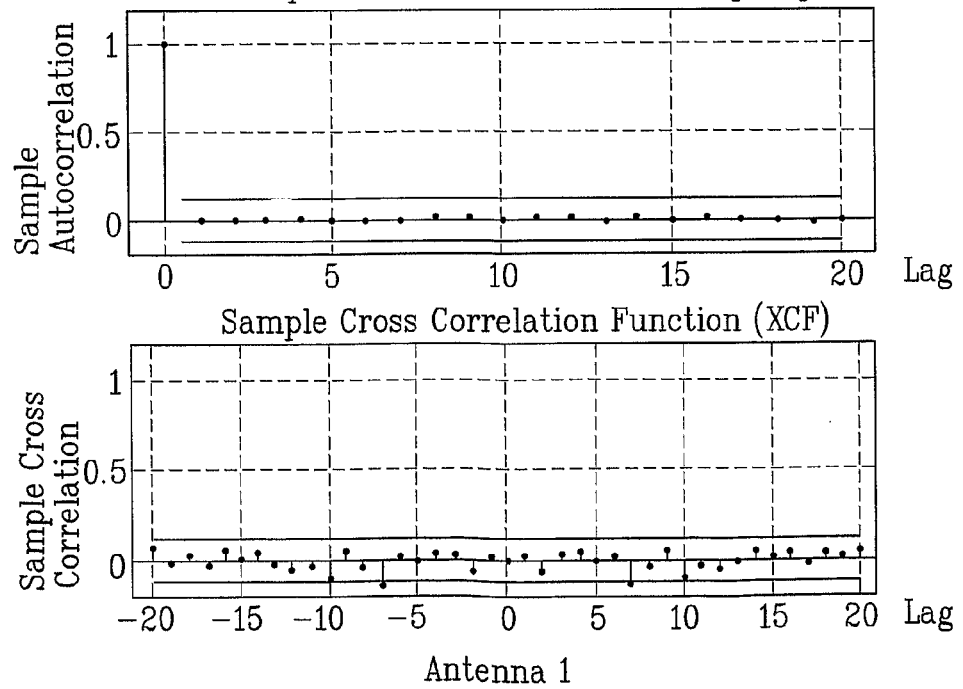

FIG. 10

| Subcarrier index → | 0 | 2 | 4 | 6 | 8 | 10 | 12 | 14 | 16 | 18 | 20 | 22 | ... |
|---|---|---|---|---|---|---|---|---|---|---|---|---|---|
| Antenna 0, Symbol 0 | $x_0$ | | $x_1$ | | $x_2$ | | $x_3$ | | $x_4$ | | $x_5$ | | ⋮ |
| Antenna 0, Symbol 1 | | $x_0^*$ | | $x_1^*$ | | $x_2^*$ | | $x_3^*$ | | $x_4^*$ | | $x_5^*$ | ⋮ |
| Antenna 1, Symbol 0 | $x_0$ | | $x_1$ | | $x_2$ | | $x_3$ | | $x_4$ | | $x_5$ | | ⋮ |
| Antenna 1, Symbol 1 | | $-x_0^*$ | | $-x_1^*$ | | $-x_2^*$ | | $-x_3^*$ | | $-x_4^*$ | | $-x_5^*$ | ⋮ |

$T_s$ : OFDM symbol transmission interval
$T_p$ : Modified pilot symbol transmission interval
$T_g$ : CP transmission interval $T_p = (T_s - T_g)/2 + T_g$

METHOD AND APPARATUS FOR TRANSMITTING PILOT SYMBOLS IN WIRELESS COMMUNICATION SYSTEM

CROSS-REFERENCE TO RELATED APPLICATIONS

This application is the National Stage filing under 35 U.S.C. §371 of International Application No. PCT/KR2006/002784, filed on Jul. 14, 2006, which claims the benefit of U.S. Provisional Application No. 60/782,547, filed on Mar. 14, 2006, and claims the benefit of earlier filing date and right to priority to Korean Application No. 10-2005-0064427, filed on Jul. 15, 2005, and Korean Application No. 10-2005-0108039, filed on Nov. 11, 2005.

TECHNICAL FIELD

The present invention relates to a wireless communication system, and more particularly, to an apparatus for transmitting pilot symbols in an MIMO multi-carrier communication system and method thereof.

BACKGROUND ART

Generally, OFDM (orthogonal frequency division multiplexing) uses multi-subcarrier modulation. An orthogonal frequency division transmission system uses a CP (cyclic prefix) attached to a front of an OFDM symbol by copying a signal of a last part of the OFDM symbol to compensate for multi-path in transmitting a signal. Owing to this feature, the orthogonal frequency division transmission system has excellent performance in a multi-path and moving reception environment to be spotlighted as a high-speed mobile communication transmission system.

In a wireless communication system environment, multi-path fading takes place due to multi-path duration. A process that a receiving side recovers a transmission signal by compensating signal distortion generated from a rapid environmental variation attributed to fading is called a channel estimation. And, a pilot symbol known between transmitting and receiving sides is used for the channel estimation in general.

In a wireless communication system that uses an orthogonal frequency division transmission, there are a method of allocating training symbols to all subcarriers and a method of allocating training symbols between data subcarriers. The method of allocating training symbols to all subcarriers corresponds to a method of allocating pilot symbols across all subcarriers without data allocation like a case of preamble or midamble. And, the method of allocating training symbols between data subcarriers corresponds to a method of allocating a pilot symbol to a subcarrier between subcarriers having data allocated thereto.

The method of allocating pilot symbols between data subcarriers is able to increase a transmission quantity of data but decreases density of pilot symbols, whereby a degradation of channel estimation efficiency takes place. In a single input/output transmission method, a preamble or midamble, which is known to both a transmitting side and a receiving side and has high density of pilot symbols in general, is used for channel estimation.

A receiving side, which knows information of pilot symbol, is able to estimate a channel by parsing a received signal and is also able to precisely estimate data sent from a transmitting side by compensating an estimated channel value.

In particular, assuming that a pilot symbol sent from a transmitter, channel information undergone by a pilot symbol in transmission, a thermal noise generated from a receiver and a signal received by the receiver are P, h, n and y, respectively, 'y' can be expressed by Formula 1.

$$y = h \cdot p + n \qquad \text{[Formula 1]}$$

In this case, the pilot symbol P is already known by the receiver. So, channel information ($\hat{h}$) can be estimated according to Formula 2.

$$\hat{h} = y/p = h + n/p = h + \hat{n} \qquad \text{[Formula 2]}$$

In this case, accuracy of a channel estimation value $\hat{h}$ estimated the pilot symbol P depends on a value of $\hat{n}$. For an estimation of an accurate value of $\hat{h}$, $\hat{n}$ needs to converge into 0. For this, influence of $\hat{n}$ has to be minimized by estimating a channel using a number of pilot symbols.

In a preamble used by IEEE 802.16 OFDMA system, one of 128, 512, 1024 and 2048 is selected to be used as the number of subcarriers of a frequency. Portions of both sides of the subcarriers are used as a guard interval and the rest of the areas are used for a pilot symbol per three subcarriers as follows. FIG. 1 is a diagram of an example of allocating one pilot symbol per three subcarriers.

$$\text{PreambleCarrierSet}_n = n + 3 \cdot k$$

PreambleCarrierSet$_n$: all subcarriers allocated to a specific prefix n: number 0 . . . 2 of indexed prefix symbol carrier sets k: consecutive indexes 0 . . . 283 of prefix subcarriers Segment 0: Prefix carrier set 0 used (PreambleCarrierSet$_0$)

Segment 1: Prefix carrier set 1 used (PreambleCarrierSet$_1$)

Segment 2: Prefix carrier set 2 used (PreambleCarrierSet$_2$)

PN series usable as pilot symbols are numerated in Table 1. PN series to be used depend on a segment number and an IDcell parameter value. Each of the defined PN series is mapped to a subcarrier in a sequence of an ascending series. In Table 1, a PN series is represented by a system of progressing by 16. To obtain a corresponding PN code value, a progressing-by-16 series is converted to a binary series $W_k$ and the $W_k$ is then mapped from MSB to LSB. (0 is mapped to +1 and 1 is mapped to −1. For instance, since Wk is 110000010010 . . . in a $0^{th}$ segment having an index 0, a converted PN code value is −1 −1 +1 +1 +1 +1 +1 −1 +1 +1 −1 +1 . . . .)

TABLE 1

| Index | ID cell | Segment | Modulated Series (progressing-by-16 system) |
|---|---|---|---|
| 0 | 0 | 0 | A6F294537B285E1844677D133E4D53CCB1F 182DE00489E53E6B6E77065C7EE7D0ADBEAF |
| 1 | 1 | 0 | 668321CBBE7F462E6C2A07E8BBDA2C7F7946 D5F69E35AC8ACF7D64AB4A33C467001F3B2 |
| 2 | 2 | 0 | 1C75D30B2DF72CEC9117A0BD8EAF8E050246 1FC07456AC906ADE03E9B5AB5E1D3F98C6E |
| . | . | . | . |
| . | . | . | . |
| . | . | . | . |

A pilot symbol is a signal used to perform time or frequency synchronization between at least two or more systems in wireless communications and to estimate a time-variable channel. In case of IEEE 802.16 system, a pilot symbol is arranged to have a signal of a symmetric structure in a time domain to synchronize a transmission timing. However, the related art pilot symbol transmission method has a problem that a receiving side has difficulty in recovery when a same pilot symbol is transmitted per a transmitting antenna in a multi input-output system.

Namely, in a related art wireless communication system according to single input/output orthogonal frequency division transmission, a pilot symbol is utilized for a channel estimation by transmitting the pilot symbol. Yet, in a multi input/output orthogonal frequency division transmission, a pilot symbol is difficult to be used if it is transmitted per antenna. In particular, in case that pilot symbols are simultaneously transmitted from antennas, respectively, interference exists between the transmitted pilot symbols. So, a receiver is impossible to perform independent channel estimation on a channel path at a transmitting/receiving end. Signals of different transmitting antennas work as noise components to degrade performance of a synchronizing unit in channel estimation, signal detection, frequency offset estimation and the like.

DISCLOSURE OF INVENTION

Accordingly, the present invention is directed to an apparatus for transmitting pilot symbols in an MIMO multi-carrier communication system and method thereof that substantially obviate one or more of the problems due to limitations and disadvantages of the related art.

An object of the present invention is to provide an apparatus for transmitting pilot symbols in a wireless communication system of multi input/output multiplexing and method thereof.

Another object of the present invention is to provide a method of generating a plurality of pilot symbol sequences in a wireless communication system of multi input/output multiplexing, by which transmissions are performed differently through a plurality of transmitting antennas, respectively.

To achieve these and other advantages and in accordance with the purpose of the present invention, in a communication system performing communications using a plurality of antennas and multiple carriers, a method of transmitting pilot symbols according to the present invention includes the steps of generating a plurality of pilot symbol sequences based on a basic code sequence, data-processing the plurality of pilot symbol sequences by allocating each of a plurality of the pilot symbol sequences to the multiple carriers, and transmitting each of the plurality of data-processed pilot symbol sequences via a corresponding one of the plurality of antennas.

In another aspect of the present invention, in a communication system performing communications using a plurality of antennas and multiple carriers, a method of transmitting pilot symbols includes the steps of data-processing a plurality of pilot symbol sequences generated based on a basic code sequence in a manner of allocating each of the plurality of pilot symbol sequences to the multiple carriers and transmitting each of the plurality of data-processed pilot symbol sequences via a corresponding one of the plurality of antennas.

In another aspect of the present invention, in a communication system performing communications using a plurality of antennas and multiple carriers, an apparatus for transmitting data includes a subcarrier allocating module allocating each of a plurality of pilot symbol sequences generated based on a basic code sequence to the multiple carriers and a data processing module performing a data processing on each of the plurality of pilot symbol sequences allocated to the multiplexing subcarrier to be transmitted via a random transmitting antenna.

BRIEF DESCRIPTION OF THE DRAWINGS

FIGS. 5 to 8 are diagrams to explain a method of generating a pilot symbol sequence and a method of allocating a generated pilot symbol sequence to a subcarrier according to a first embodiment of the present invention.

FIGS. 9 to 17 are diagrams to explain a method of generating a pilot symbol sequence and a method of allocating a generated pilot symbol sequence to a subcarrier according to a second embodiment of the present invention.

BEST MODE FOR CARRYING OUT THE INVENTION

The aforesaid objectives, features and advantages of the invention will be set forth in the description which follows, and in part will be apparent from the description. Reference will now be made in detail to one preferred embodiment of the present invention, examples of which are illustrated in the accompanying drawings.

Embodiments explained in the following description are examples that the technical features of the present invention are applied to MIMO-OFDMA system.

Figure 1:
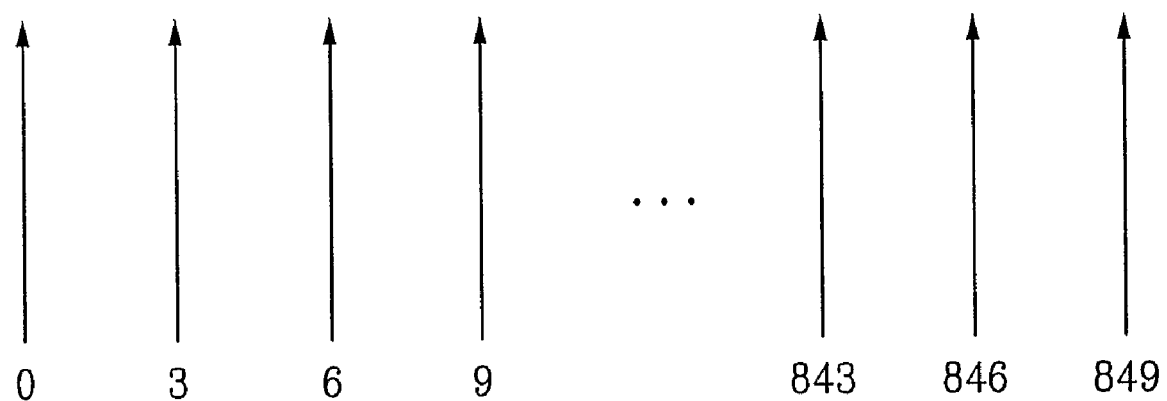
FIG. 1 is a diagram of an example of allocating one pilot symbol per three subcarriers.
Figure 2:
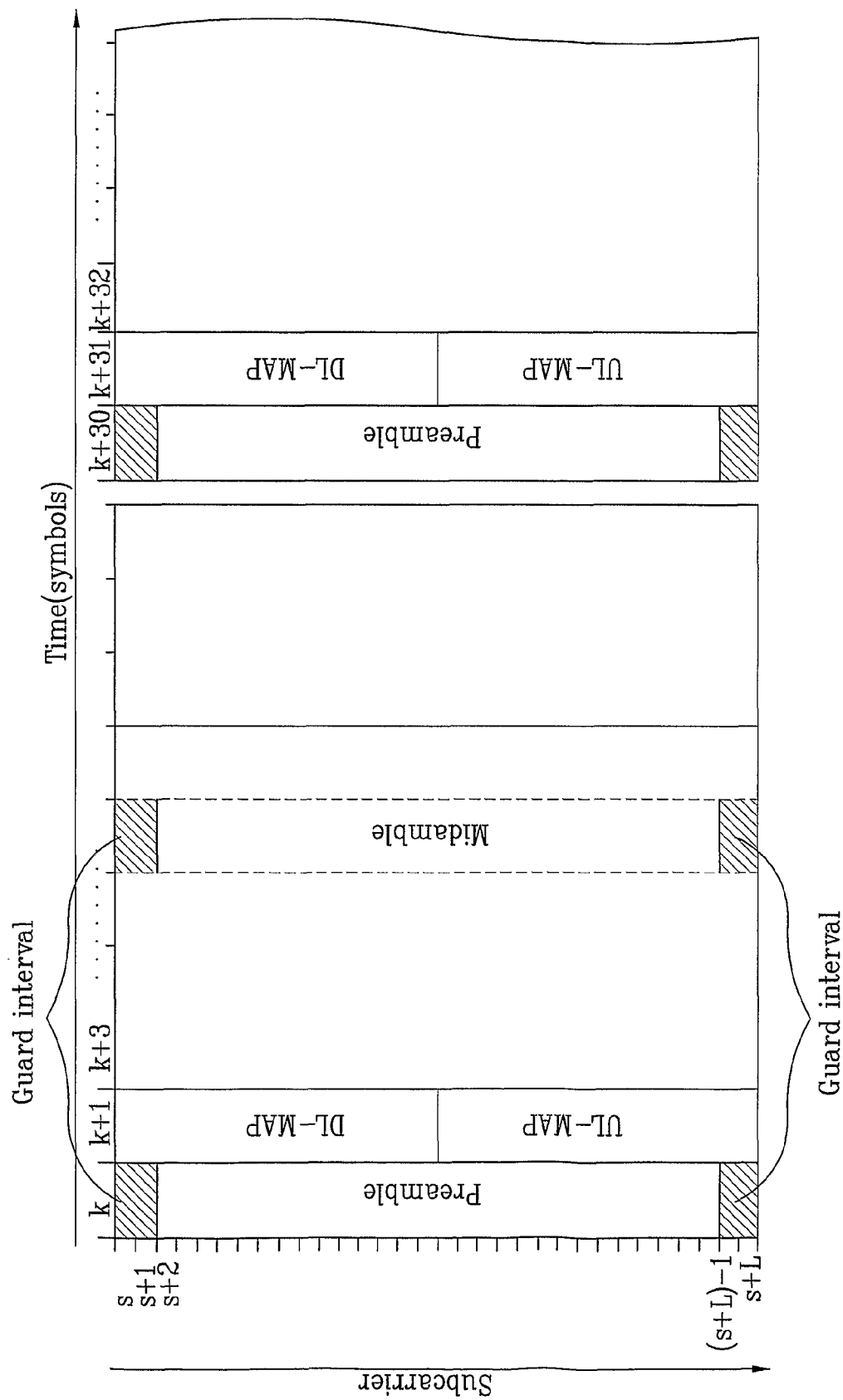
FIG. 2 is a diagram of an example of a data frame used in an OFDMA wireless communication system.

FIG. 2 is a diagram of an example of a data frame used in an OFDMA wireless communication system. In FIG. 2, a horizontal axis is a frequency axis represented by a subchannel unit. In this case, a subchannel means a bundle of a plurality of subcarriers. In FIG. 2, each data frame begins with a preamble and may include a midamble in a central part of the data frame if necessary. Pilot symbols are arranged in the preamble and midamble parts to be evenly spaced apart from each other on the frequency axis. The entire subcarriers are allocated to the preamble and the midamble except guard intervals at both sides of preamble and the midamble to be modulated. The preamble and the midamble can be used for a usage in a receiving side such as time and frequency synch acquisition, channel estimation and the like.

Figure 3A:
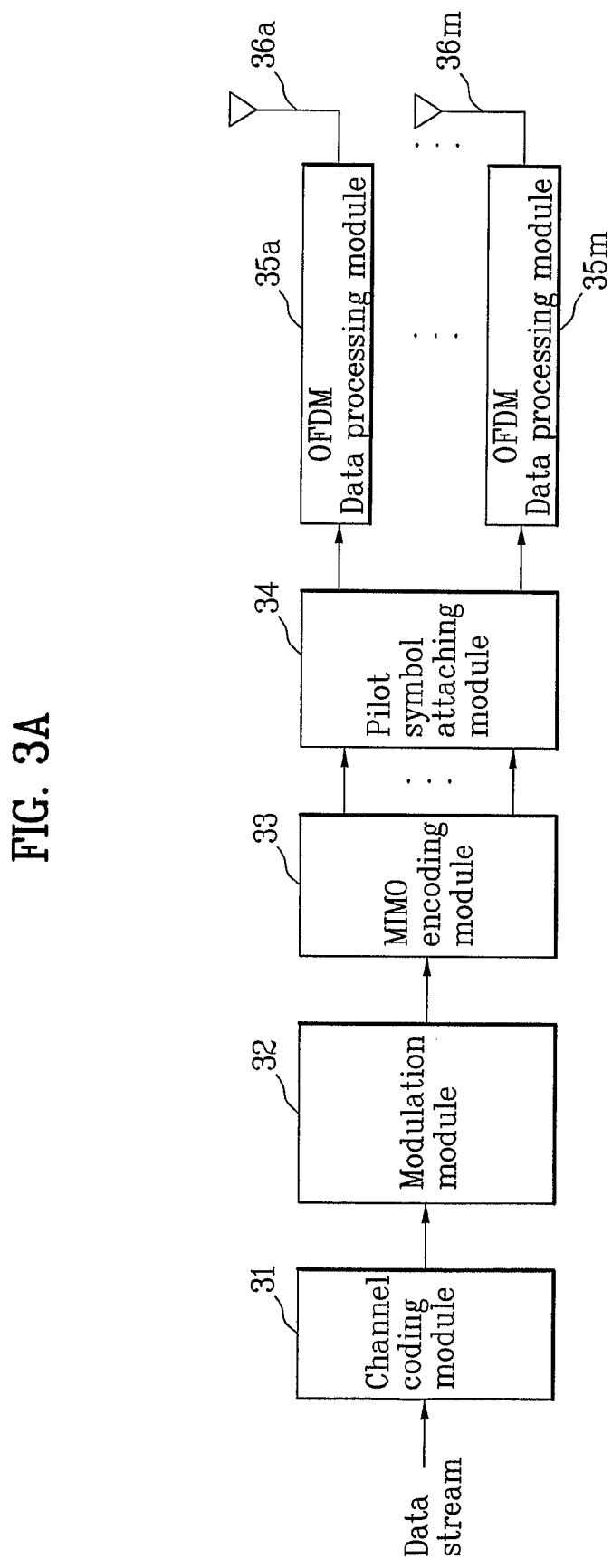
FIG. 3A and FIG. 3B are block diagrams of a transmitter according to one preferred embodiment of the present invention.

FIG. 3A is a block diagram of a transmitter according to one preferred embodiment of the present invention.

Referring to FIG. 3A, an input data stream is channel-decoded by a channel coding module 31. Channel coding is to attach parity bits to system bits to enable a receiving side to correct errors generated in the course of transmitting data via a channel. As a channel coding scheme, there is convolution coding, turbo coding, LPDC (low density parity check) coding or the like. Besides, the present invention is able to employ various other coding schemes. Symbol mapping is performed on binary data channel-coded by the channel coding module 31 by a modulation module 32 according to digital modulation scheme such as QPSK, QAM and the like.

Data symbols outputted from the modulation module 32 are inputted to an MIMO encoding module 33 to undergo multi-antenna encoding.

Multi-antenna encoding is to perform a data processing according to a pre-agreed method on data symbols to increase system capacity, throughput, coverage and the like in transmitting the data symbols via a plurality of transmitting antennas. As a multi-antenna encoding scheme, there is SDM (spatial division multiplexing), STC (space time coding) or the like. The SDM scheme is a scheme that maximizes a transmission rate by sending independent data to antennas, respectively. The STC scheme is a scheme that enhances link level performance by obtaining an antenna diversity gain and a coding gain in a manner of applying coding at a symbol level across spatial and temporal domains. The SDM scheme and the STC scheme are appropriately combined and generalized to produce LDC (linear dispersion coding). All multi-antenna techniques can be represented by LDC matrix used for multi-antenna encoding and decoding. By multi-antenna encoding, data symbols to be transmitted via respective transmitting antennas can be discriminated. For instance, in case that there are four transmitting antennas, a data symbol sequence outputted from the modulation module 32 is multi-antenna-encoded by the MIMO encoding module 33 and is then outputted as four data symbol sequences.

A pilot symbol is attached to each of the data symbol sequences, which is allocated to the corresponding transmitting antenna after having been multiantenna-encoded by the MIMO encoding module 33, by a pilot symbol attaching module 34. In this case, the pilot symbol means a reference signal arranged at the preamble or midamble part shown in FIG. 2.

The pilot symbol attaching module 34 stores a plurality of pilot symbol sequences previously generated from a basic code sequence by a prescribed method. If a data symbol sequence is inputted, the pilot symbol attaching module 34 attaches the inputted data symbol sequence to a preset position. In this case, the preset position may include a position corresponding to the preamble or midamble part shown in FIG. 2.

The data symbol sequences, to which pilot symbols are attached, are inputted to OFDM data processing modules 35a to 35m, respectively. Each of the OFDM data processing modules 35a to 35m performs a data processing necessary for orthogonal frequency division transmission on the inputted data symbol sequences, respectively. In this case, the data processing for the orthogonal frequency division transmission means a data processing process generally required for transmitting data by OFDM.

Figure 3B:
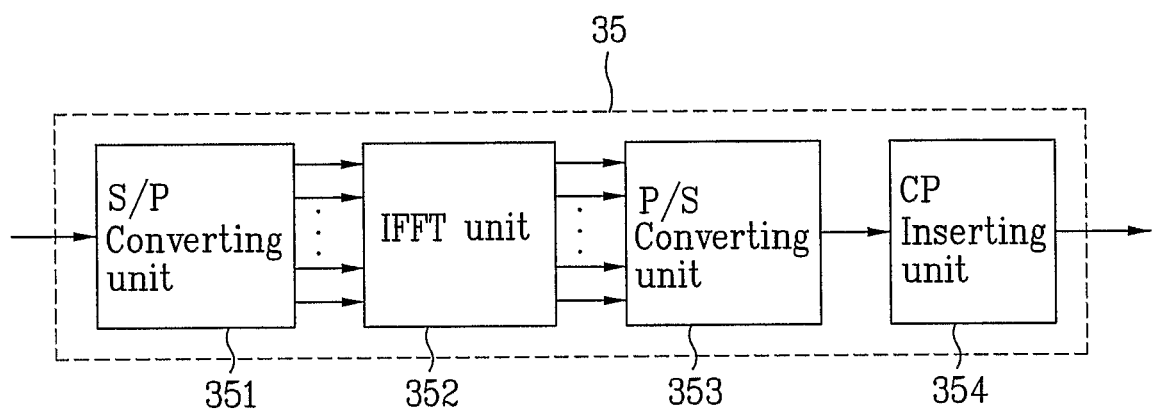

FIG. 3B shows an example of a detailed configuration of the OFDM data processing module 35.

Referring to FIG. 3B, the OFDM data processing module 35 includes an S/P converting unit 351, an IFFT unit 352, a P/S converting unit 353 and a CP symbol inserting unit 354.

The S/P converting unit 351 converts an inputted serial data symbol sequence to a parallel data symbol sequence.

The IFFT unit 352 converts the parallel data symbol sequence outputted from the S/P converting unit 351 to a signal of a time domain by performing IFFT. A process of IFFT is a process that converts a frequency-domain signal to a time-domain signal by modulating a data symbol sequence using a plurality of carriers.

The P/S converting unit 353 converts the parallel data symbol sequence outputted from the IFFT unit 352 to a serial data symbol sequence.

The CP inserting unit 354 inserts a guard interval in the data symbol sequence in the time domain. The CP inserting unit 354 is able to insert the guard interval by a cyclic prefix method, a cyclic postfix method or a combined method including the cyclic prefix and postfix.

A time-domain data symbol sequence outputted from the CP inserting unit 354 is called an OFDM symbol. The OFDM symbols outputted from the OFDM data processing modules 44a to 44m are transmitted via transmitting antennas 36a to 36m, respectively through necessary processes including radio modulation, amplification and the like.

The configuration of the OFDM data processing module 35 shown in FIG. 3B represents minimal elements necessary for processing data according to OFDM or OFDMA. And, additional elements can be added to the configuration in a real OFDM communication system if necessary.

Figure 4A:
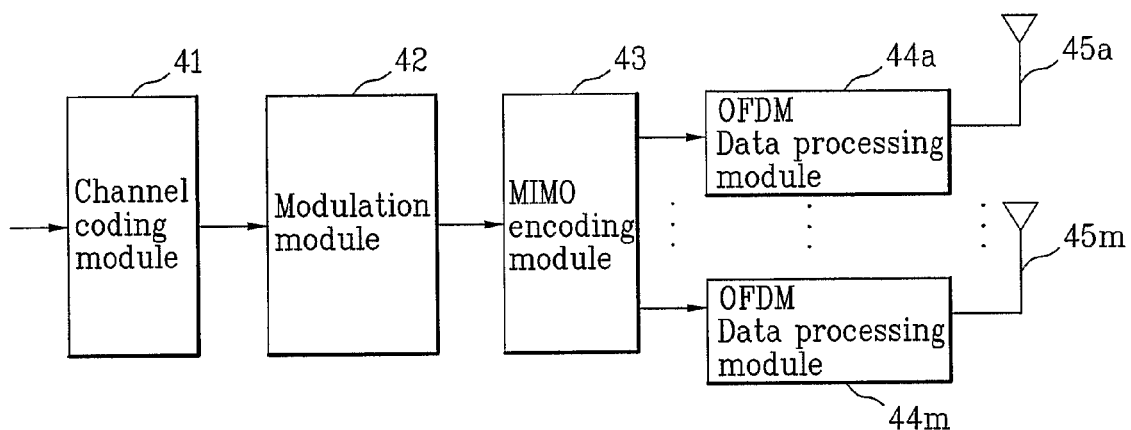
FIG. 4A and FIG. 4B are block diagrams of a transmitter according to another preferred embodiment of the present invention.
Figure 4B:
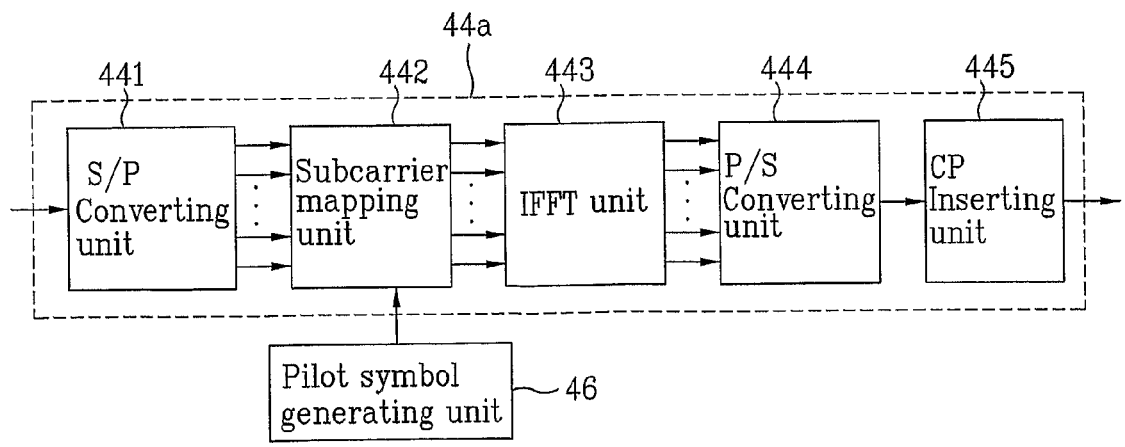

FIG. 4A and FIG. 4B are block diagrams of a transmitter according to another preferred embodiment of the present invention.

This embodiment differs from the former embodiment shown in FIG. 3A and FIG. 3B in a function and position of a pilot symbol generating module 46. The pilot symbol generating module 46 generates a plurality of pilot symbol sequences corresponding to the number of transmitting antennas from one basic code sequence and then provides the generated pilot symbol sequences to subcarrier mapping units 442 of OFDM data processing modules 44a to 44m, respectively. In FIG. 4A, functions of a channel coding module 41, a modulating module 42, an MIMO encoding module 43 and OFDM data processing modules 44a to 44m are identical to those explained in FIG. 3A. Yet, in FIG. 4A, data symbol sequences multi-antenna-encoded by the MIMO encoding module 43 are inputted to the OFDM data processing modules 44a to 44m without addition of pilot symbols, respectively.

Referring to FIG. 4B, an S/P converting unit 441 converts an inputted serial symbol sequence to a parallel symbol sequence. A subcarrier mapping unit 442 maps the parallel-converted data symbol sequence to a subcarrier. A pilot symbol generating unit 46 generates a plurality of pilot symbol sequences corresponding to the number of transmitting antennas from one basic code sequence and then provides pilot symbols to the subcarrier mapping unit 442. The pilot symbol generating module 46 is able to provide a pilot symbol to the subcarrier mapping unit 442 at a position corresponding to the preamble or midamble of a downlink data frame (cf. FIG. 2). In FIG. 4B, explanations of an IFFT unit 443, a P/S converting unit 444 and a C/P converting unit 445 are identical to those explained in FIG. 3B, which will be omitted in the following description.

Embodiments for a method of generating a plurality of pilot symbol sequences from the basic code sequence and a method of allocating a plurality of the generated pilot symbol sequences to subcarriers by performing data processing on the generated pilot symbol sequences to transmit the data-processed sequences via a plurality of antennas are explained as follows.

First Embodiment

A first embodiment relates to an example of generating two pilot symbol sequences by performing encoding using an orthogonal code based on one basic code sequence in case that there are two transmitting antennas. Namely, the first embodiment relates to a transmission via two antennas by multiplying the basic code sequence by the orthogonal code, in which two pilot symbol sequences generated by frequency axis encoding using alamouti code by two antennas and two subcarriers unit (2×2) are used as a pilot symbol sequence of each of the transmitting antennas based on a basic code sequence (e.g., each code sequence in Table 1). In this case, alamouti code or hadamard code or the like can be used as the orthogonal code, which does not put limitation on a type of the orthogonal code.

Figure 5:
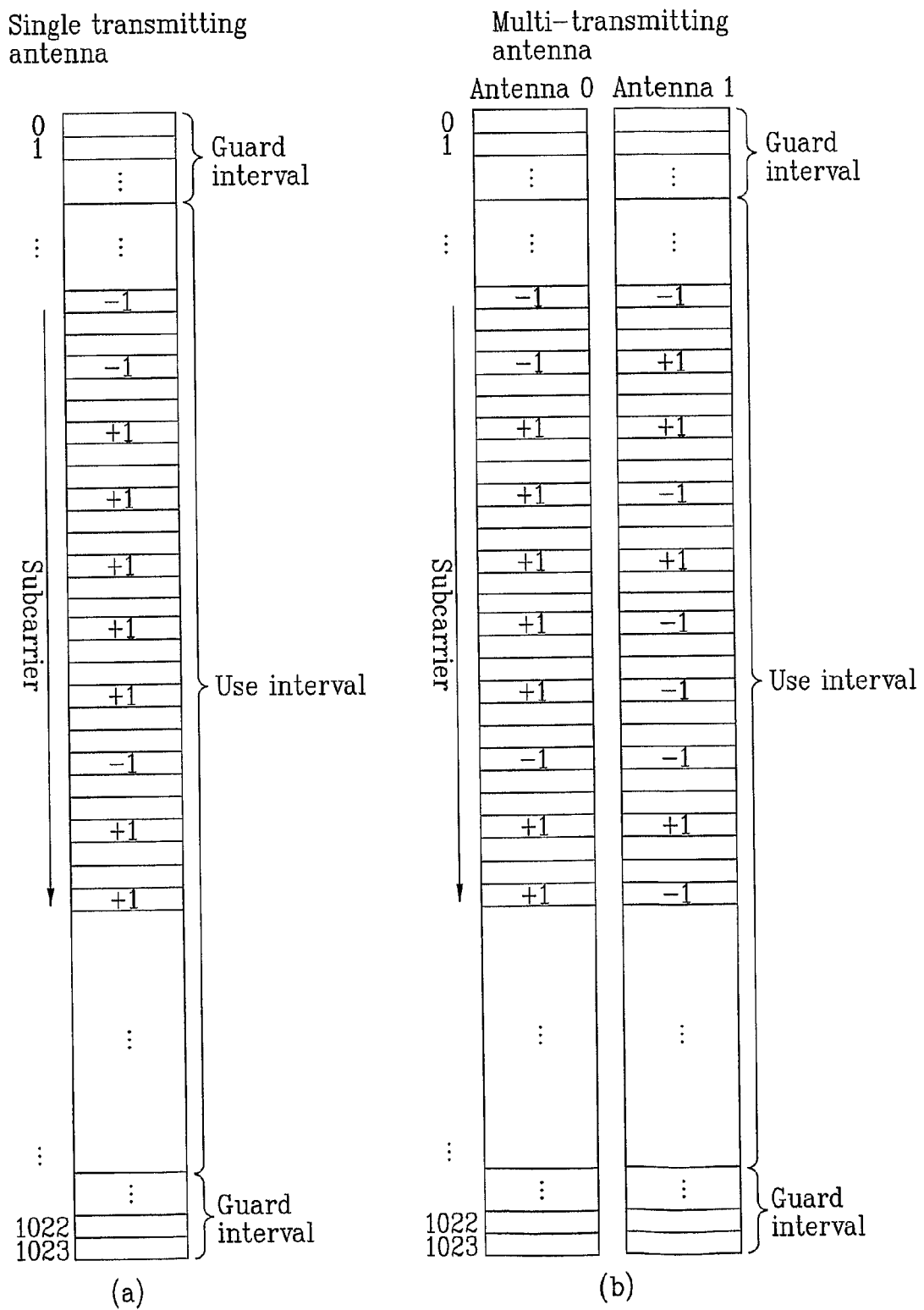

FIG. 5 and FIG. 6 are diagrams for explaining a pilot symbol sequence generating method and a method of allocating the generated pilot symbol sequence to a subcarrier according to a first embodiment of the present invention. FIG. 5(a) shows a basic code sequence allocated to a subcarrier in case of using a single transmitting antenna. FIG. 5(b) and FIG. 6 show two pilot symbol sequences allocated to a subcarrier in a multi-antenna system using two transmitting antennas.

In FIG. 5 and FIG. 6, since the number of transmitting antennas is 2, a 2×2-dimensional orthogonal code is used. So, in case of using an orthogonal code over 3×3, it is applicable to a multi-antenna system having at least three transmitting antennas.

A signal encoded and transmitted in the above manner is received by a receiving side according to Formula 3.

$$\begin{bmatrix} y_{6k} \\ y_{6k+3} \end{bmatrix} = \sqrt{\frac{E_s}{2}} \begin{bmatrix} x_{2n} & x_{2n+1} \\ x_{2n+1}^* & -x_{2n}^* \end{bmatrix} \begin{bmatrix} h_0 \\ h_1 \end{bmatrix} + \begin{bmatrix} n_{6k} \\ n_{6k+3} \end{bmatrix}$$ [Formula 3]

$y_k$: Reception signal of $k^{th}$ subcarrier index
k: Subcarrier index
$h_a$: Channel information from $a^{th}$ transmitting antenna
a: Transmitting antenna index
$n_k$: Thermal noise of $k^{th}$ subcarrier index
$X_n$: $n^{th}$ training symbol
n: Training symbol index Like formula 3, a received signal is able to estimate a channel value $h_a$ from each antenna by Formula 4 using a basic code sequence $x_n$ known by a receiver.

$$\begin{bmatrix} \hat{h}_0 \\ \hat{h}_1 \end{bmatrix} = \sqrt{\frac{E_s}{2}}^{-1} \begin{bmatrix} x_{2n} & x_{2n+1} \\ x_{2n+1}^* & -x_{2n}^* \end{bmatrix}^{-1} \begin{bmatrix} y_{6k} \\ y_{6k+3} \end{bmatrix}$$ [Formula 4]

$\hat{h}_a$: Channel from estimated $a^{th}$ transmitting antenna

In this case, it is able to assume that a channel $h_a$ from an $a^{th}$ transmitting antenna corresponding to $6k^{th}$ and $(6k+3)^{th}$ subcarriers is a same value. And, channel estimation is possible by applying the same method to each receiving antenna in a same manner.

According to the first embodiment, it results in generating a pilot symbol sequence of a first antenna by multiplying a basic code sequence used in a $0^{th}$ antenna by an orthogonal code. This method enables an execution of channel estimation and enables auto-correlation and cross-correlation owned by a pilot symbol sequence of the $0^{th}$ antenna to be kept intact by the pilot symbol sequence of the first antenna, thereby enabling the same synchronization of several antennas.

Figure 8:
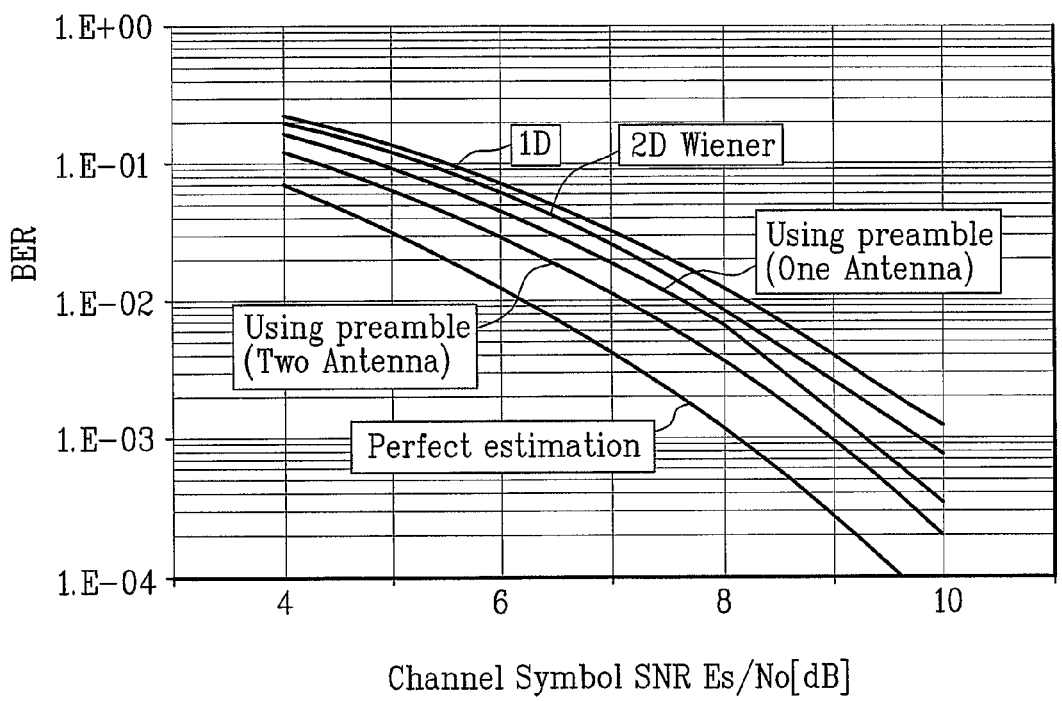

FIG. 8 shows a result of a performance test in case that pilot symbols are transmitted via two antennas under a channel environment like Table 2 according to a method of a first embodiment with reference to a pedestrian at a speed of 10 km/h. It can be seen that a case (a second lowest curve in FIG. 8) of transmitting a pilot symbol by the method according to the first embodiment has performance better than other methods except a perfect condition (a lowest curve in FIG. 8).

TABLE 2

| | Ped-B | |
|---|---|---|
| Tap | Relative delay(ns) | Mean Power (dB) |
| 1 | 0 | 0 |
| 2 | 200 | −0.9 |
| 3 | 800 | −4.9 |
| 4 | 1200 | −8.0 |
| 5 | 2300 | −7.8 |
| 6 | 3700 | −23.9 |

Second Embodiment

A second embodiment relates to an embodiment of transmitting a plurality of pilot symbol sequences generated from performing encoding on a basic code sequence using an orthogonal code via a plurality of antennas for two time symbol intervals. Assuming that an $n^{th}$ symbol of the basic code sequence, which becomes a basis in generating a plurality of pilot symbol sequences, is represented as Xn (n=0, 1, 2, 3, . . . ), encoding is performed on the basic code sequence by Alamouti code. If so, an $n^{th}$ symbol of a pilot symbol sequence allocated to a $0^{th}$ time symbol and a $1^{st}$ time symbol of $2m^{th}$ and $(2m+1)^{th}$ antennas (m=0, 1, 2, 3, . . . ) become $x_n$, $x_n^*$, $x_n$ and $-x_n^*$, respectively.

In this case, a symbol-to-symbol interval on a frequency axis of a pilot symbol sequence allocated to a $0^{th}$ time symbol of a random antenna is preferably twice greater than that of a pilot symbol sequence transmitted by a single transmitting antenna in a system that uses the single transmitting antenna. And, each symbol of a pilot symbol sequence allocated to a $1^{st}$ time symbol of the random antenna is preferably allocated between symbols of the pilot symbol sequence allocated to the $0^{th}$ time symbol of the random antenna on the frequency axis.

In case that the number of transmitting antennas is set to 4 or greater, a pilot symbol sequence allocated to a $0^{th}$ time symbol and a $1^{st}$ time symbol of $2(m+1)^{th}$ and $\{2(m+1)+1\}^{th}$ antennas is preferably allocated to a subcarrier that a pilot symbol sequence allocated to a $0^{th}$ time symbol and a $1^{st}$ time symbol of $2m^{th}$ and $(2m+1)^{th}$ antennas is shifted on a frequency axis by one subcarrier interval.

Figure 9:
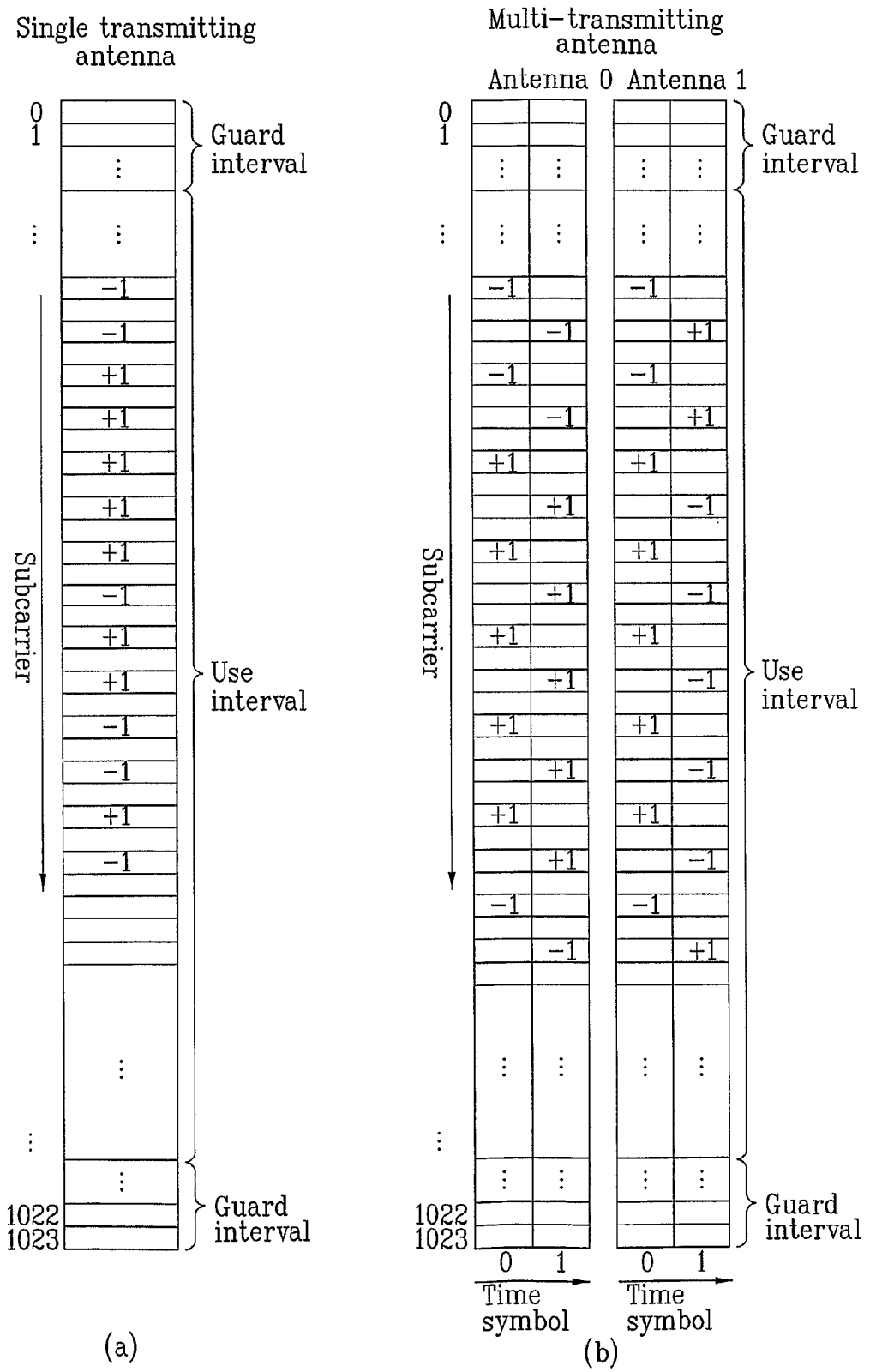

FIG. 9 and FIG. 10 show a more detailed embodiment of a case that two transmitting antennas are used. In the embodiment of FIG. 9 and FIG. 10, a symbol interval is increased into a 4-subcarriers interval (4k) and a pilot symbol having been transmitted for one OFDM symbol interval is transmitted for two OFDM symbol intervals. And, a pilot symbol sequence transmitted for a second OFDM symbol interval, as shown in FIG. 9, is mapped to have a crossing form by pushing a pilot symbol sequence transmitted for a first OFDM symbol sequence as many as two subcarrier intervals to be located at a $(4k+2)^{th}$ subcarrier. Namely, orthogonal code encoding is performed in a frequency ($3k^{th}$ subcarrier, $3(k+1)^{th}$ subcarrier)-space ($0^{th}$ antenna, $1^{st}$ antenna) in the first embodiment, whereas orthogonal code encoding is performed in a time ($0^{th}$ symbol, $1^{st}$ symbol)-frequency ($4k^{th}$ subcarrier, $(4k+2)$th subcarrier)-space ($0^{th}$ antenna, $1^{st}$ antenna). Hence, a frequency-to-frequency interval of a pilot symbol is reduced and possibility of generating a same pilot symbol sequence of another cell due to a multiplication of an orthogonal code can be removed. And, the method of the second embodiment is able to prevent PAPR (peak-to-average power ratio) from being increased. Meanwhile, according to the second embodiment, a pattern of a pilot symbol located at a $0^{th}$ time symbol of each transmitting antenna can be made identical, whereby autocorrelation and cross-correlation characteristics can be maintained.

Figure 11:
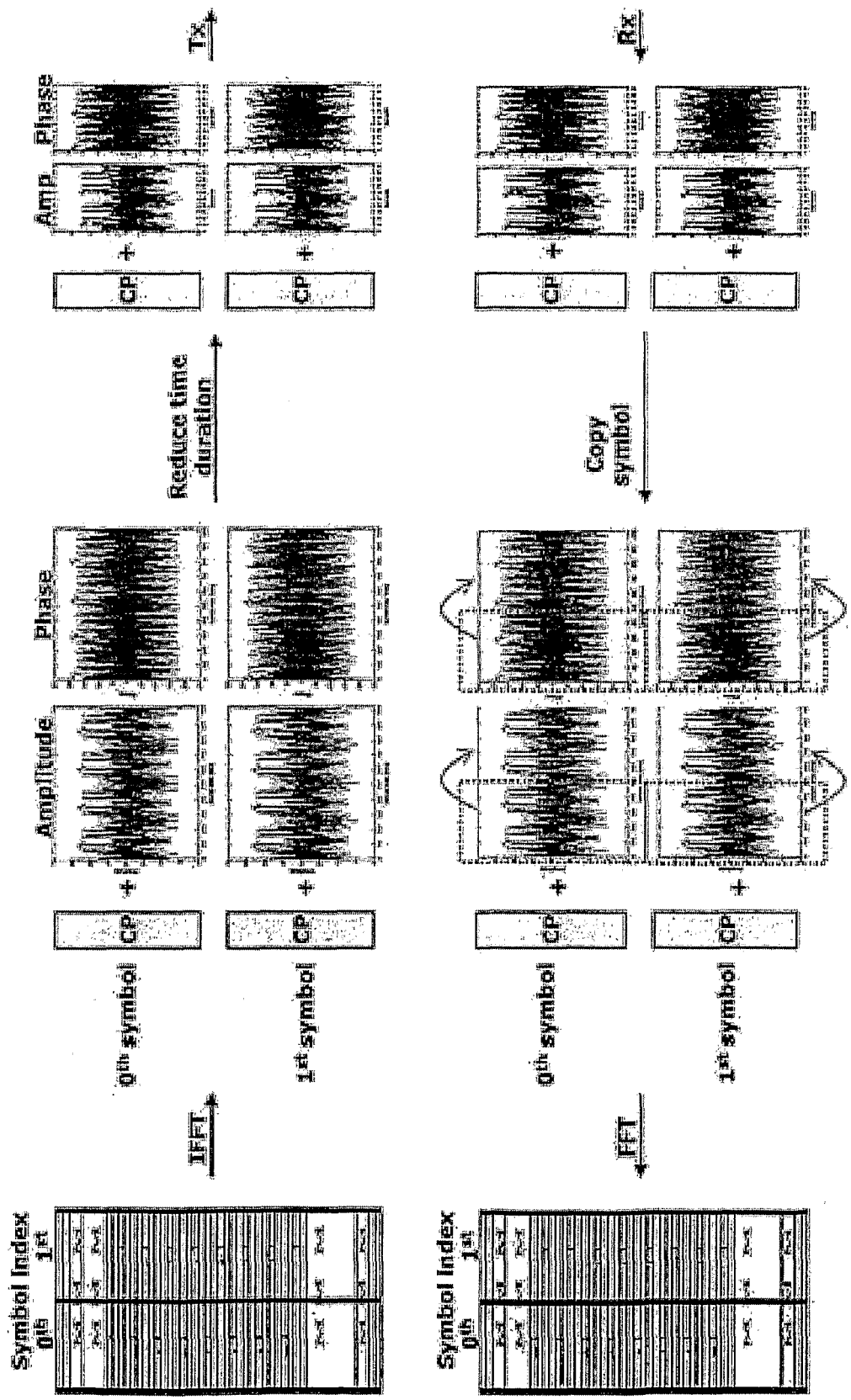
Figure 12:
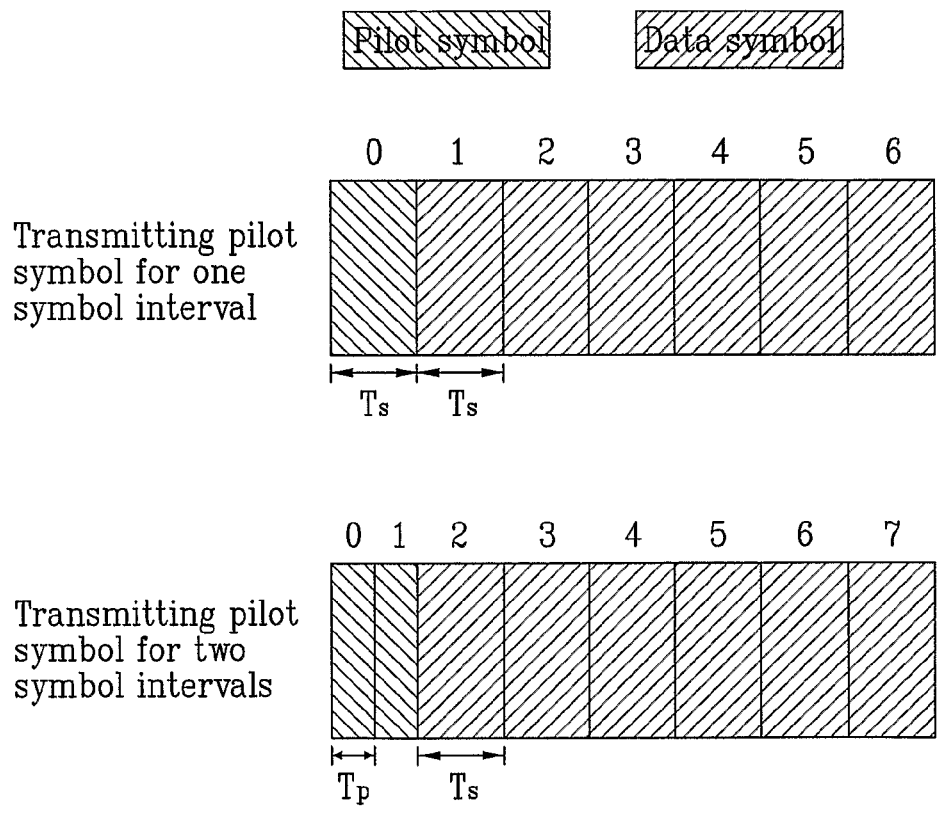

If a prefix is transmitted across two OFDM symbols, a data transmission quantity of one OFDM symbol is reduced on a time axis rather than the first embodiment. In order to compensate for this, the prefix is preferably transmitted after completion of the following process. FIG. 11 and FIG. 12 are diagrams for explaining this.

FIG. 11 is a diagram for explaining a case that a pilot symbol through orthogonal code encoding is transmitted for two time symbol intervals in a manner of converting the pilot symbol by IFFT, attaching CP to each timing symbol and transmitting a portion of a repeated signal.

In particular, in a pilot symbol of which subcarrier interval is extended to four intervals in one time symbol like FIG. 9, four-identical signals repeatedly appear for (Ts−Tg) interval on a time axis. So, instead of transmitting the repetitive four identical signals entirely, two of the four are transmitted for a time interval of (Ts−Tg)/2, as shown in FIG. 11. A receiving side copies the two repetitive signals received on the time axis, recovers the copied signals into four identical signals for the (Ts−Tg) interval and then sends the recovered signals to an OFDM receiver. Through the above process, loss of a transmission quantity on a time axis can be reduced as much as Tg corresponding to one CP interval. In FIG. 12, assuming that an OFDM symbol transmission interval and a CP transmission interval are named Ts and Tg, respectively, a prefix transmission interval Tp modified by the method shown in FIG. 11 follows Formula 5.

$$Ip=(Ts-Tg)/2+Tg \quad\quad\quad [\text{Formula 5}]$$

Figure 13:
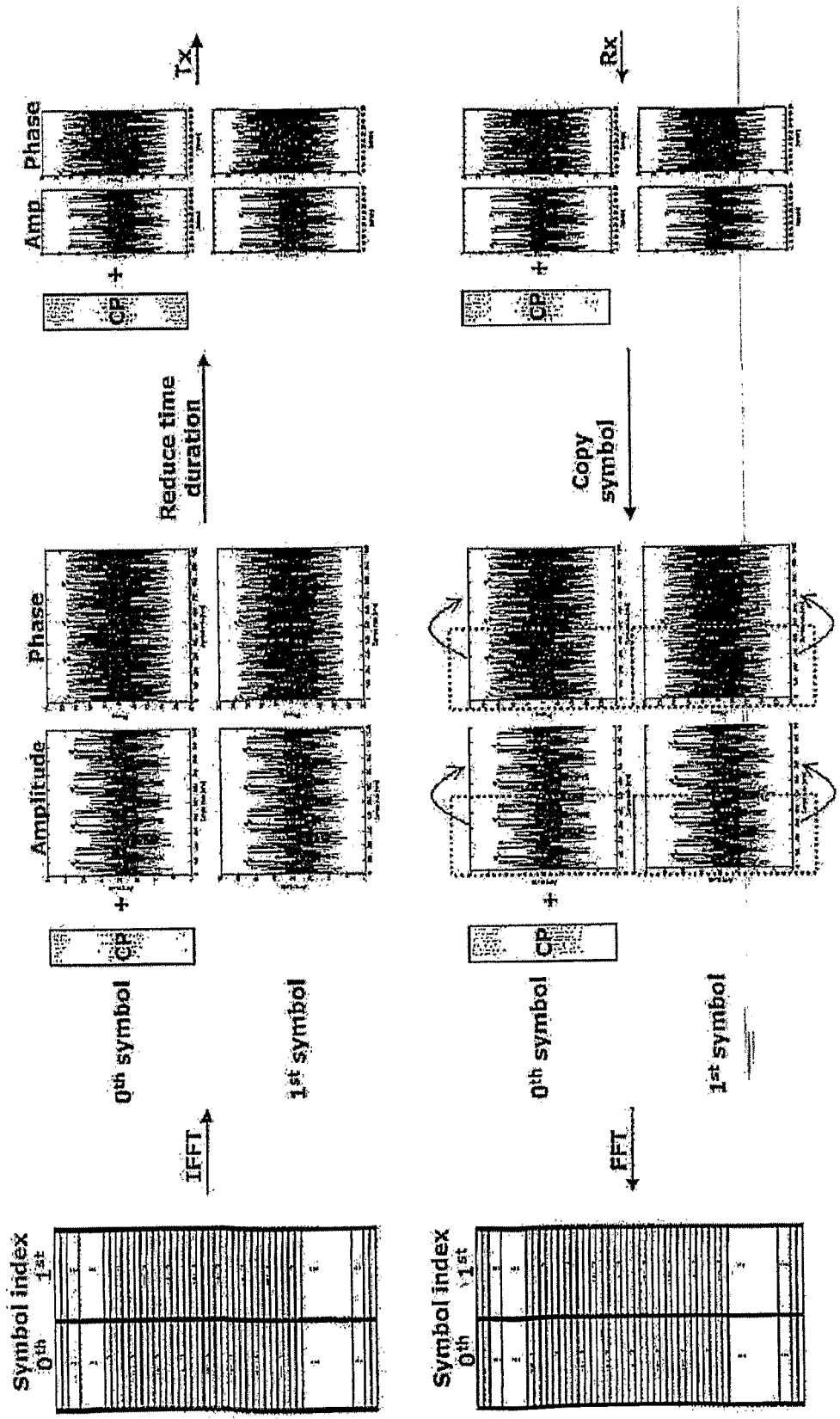

FIG. 13 shows another embodiment for reducing a time taken to transmit a pilot symbol. In the method explained in FIG. 11 takes a time of 2Tp=2{(Ts−Tg)/2+Tg} to transmit a pilot symbol for $0^{th}$ and $1^{st}$ time symbols. This means that it takes a time of Tg more than Ts that is a time taken to transmit a pilot symbol in the first embodiment. To reduce the time loss, the embodiment shown in FIG. 13 carries out a transmission without attaching CP to a $1^{st}$ pilot symbol.

A $1^{st}$ pilot symbol has a shape that 0, 1 or 2 subcarriers are shifted on a frequency axis according to an antenna. If a $1^{st}$ pilot symbol is transmitted without attaching CP to the $1^{st}$ pilot symbol on a time axis, performance degradation due to time duration may occur since there is no CP preventing the time duration in case of an antenna having a shape that 1 or 2 subcarriers are shifted. Yet, since the influence is negligible in a channel having small time duration and frequency selectivity, the transmission without CP attachment is possible.

Figure 14:
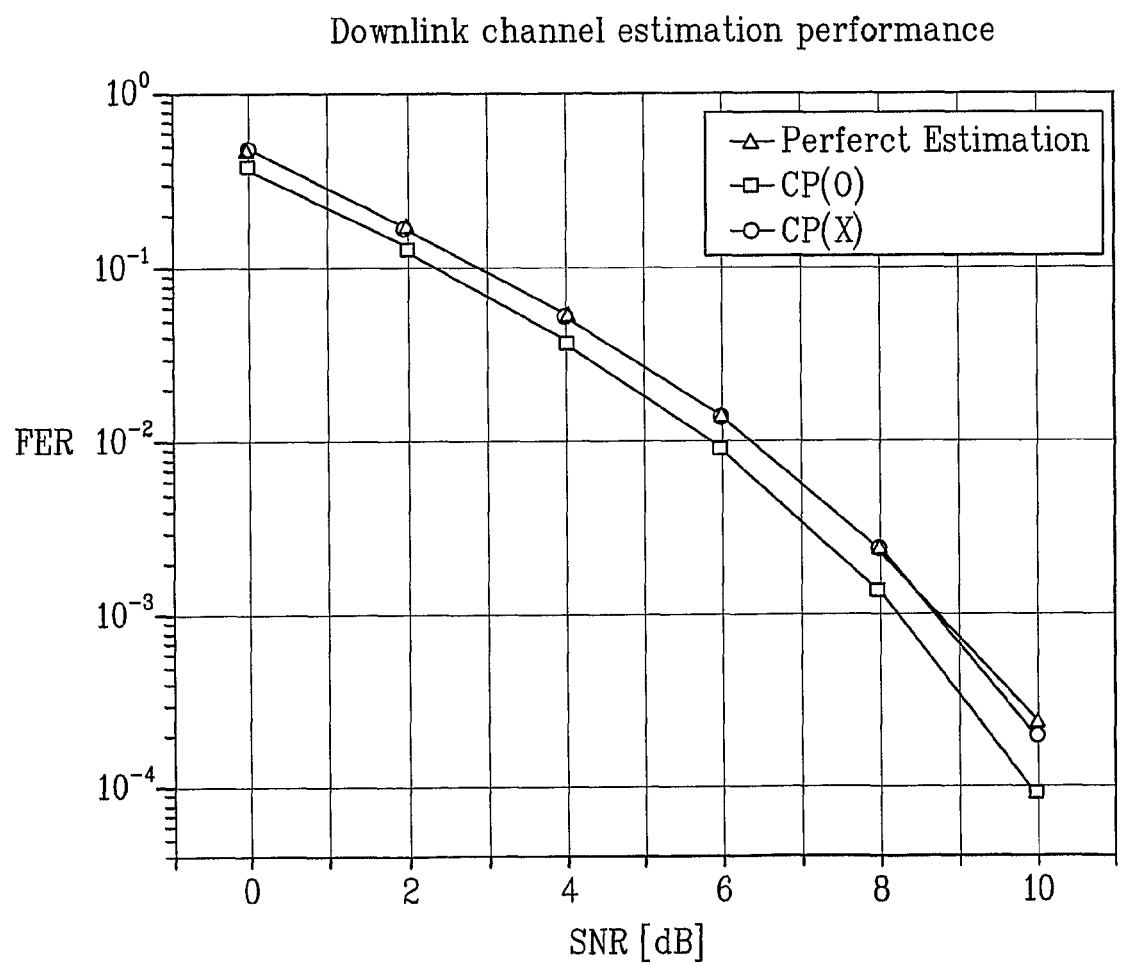

FIG. 14 is a graph of a result of simulation of comparing performance in case of attaching CP to a first prefix time symbol to performance in case of not attaching CP to the first prefix time symbol. As a result of the simulation, since degradation possible to occur by not attaching CP is not considerably greater than degradation possible to occur by attaching CP, it is possible to perform a transmission without attaching CP to a first prefix time symbol.

Figure 15:
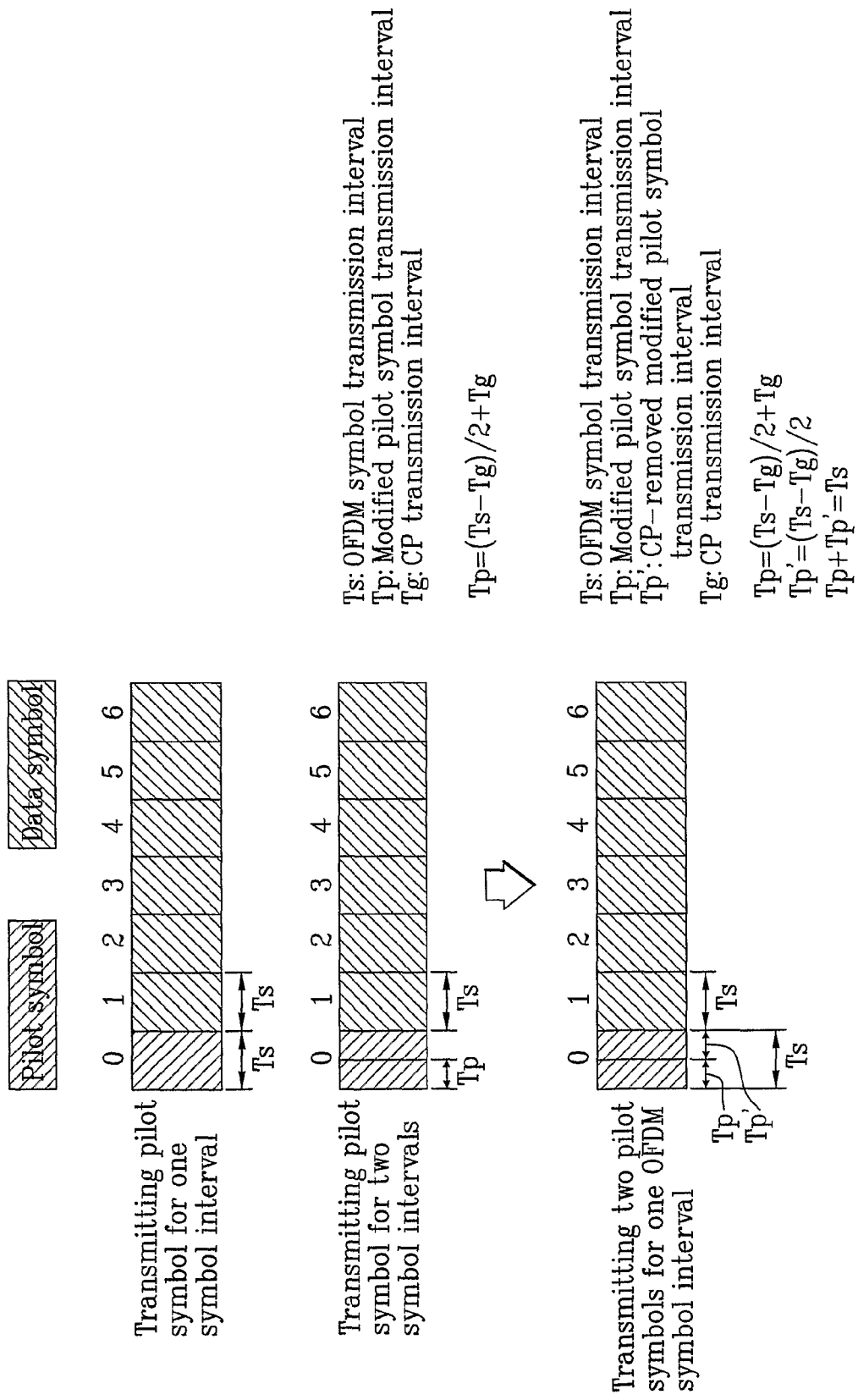

FIG. 15 shows a variation on a time axis in case of a transmission without attaching CP to a first pilot symbol. Tp meaning a modified pilot symbol transmission interval for a $0^{th}$ time symbol follows Formula 5. Tp' meaning a modified pilot symbol transmission interval without attaching CP to a $1^{st}$ time symbol follows Formula 6.

[Formula 6]

If both sides of Formula 5 are added to those of Formula 6, respectively, it becomes Tp+Tp'=Ts. In case that a $0^{th}$ pilot symbol is transmitted without having CP attached thereto, it is possible to transmit two OFDM symbols for a pilot symbol of a multi-antenna.

Figure 16:
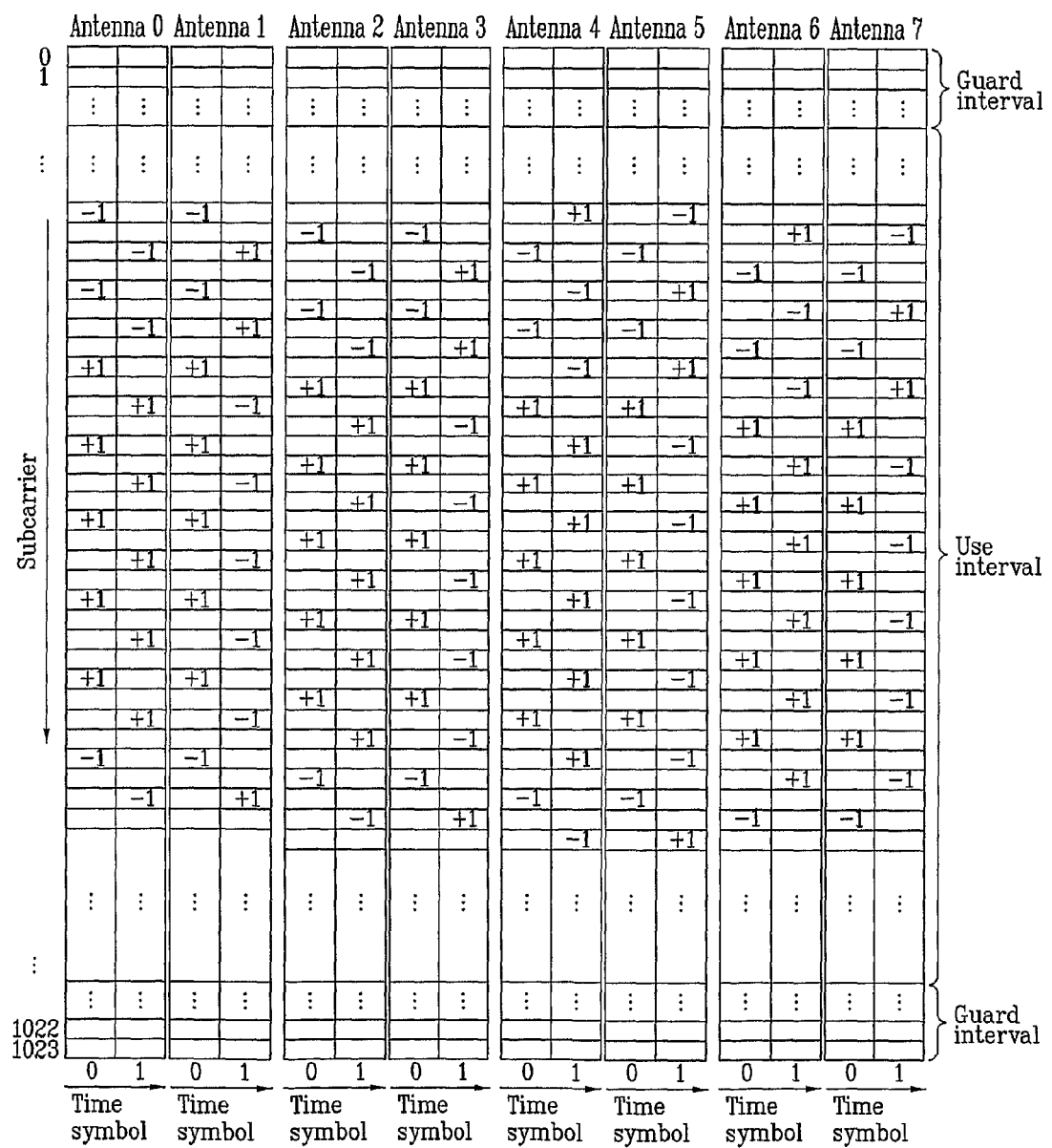
Figure 17:
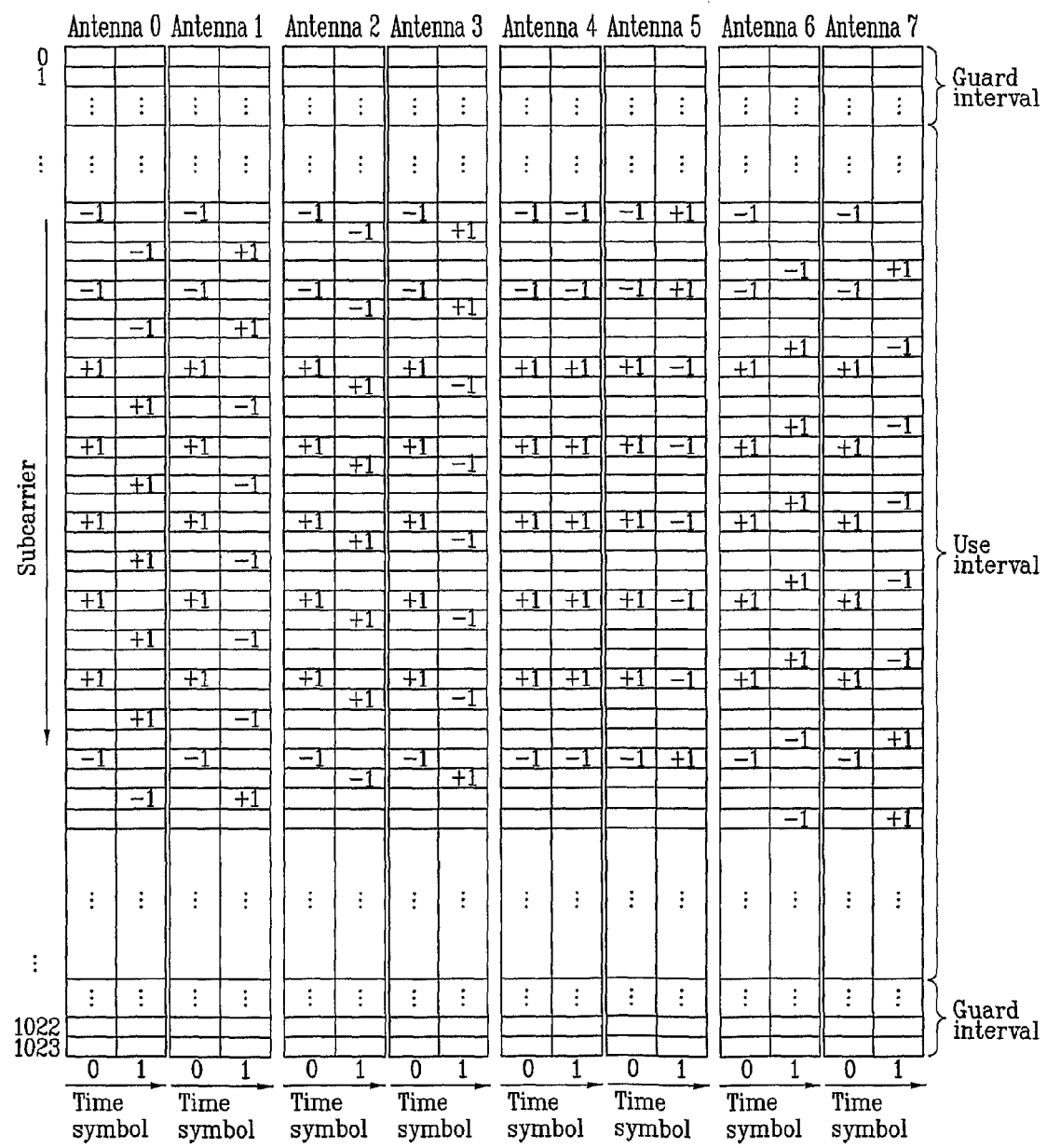

FIG. 16 and FIG. 17 show embodiments of extending the number of transmitting antennas up to 8 by extending the embodiment shown in FIG. 9.

In the embodiment shown in FIG. 16, pilot symbols allocated to $0^{th}$ and $1^{st}$ time symbols of $2(m+_1)^{th}$ and $\{2(m+1)+1\}^{th}$ antennas are allocated to subcarriers resulting from downshifting pilot symbols allocated to $0^{th}$ and $1^{st}$ time symbols of $2m^{th}$ and $(2m+1)^{th}$ antennas on a frequency axis by one subcarrier interval each, respectively.

In the embodiment shown in FIG. 17, a pilot symbol allocated to a $0^{th}$ time symbol of a $2(m+1)^{th}$ antenna is allocated to a subcarrier identical to that of a pilot symbol allocated to a $0^{th}$ time symbol of a $2m^{th}$ antenna and a pilot symbol allocated to a $1^{st}$ time symbol of a $\{2(m+1)+1\}^{th}$ antenna is allocated in a manner that a pilot symbol allocated to a $1^{st}$ time symbol of a $(2m+1)^{th}$ antenna is up-shifted on a frequency axis by one subcarrier. Compares to the embodiment shown in FIG. 17, the embodiment shown in FIG. 17 is characterized in reducing synchronization complexity by phase rotation for a $0^{th}$ time symbol.

Third Embodiment

A third embodiment shows an example of generating a plurality of pilot symbol sequences corresponding to the number of transmitting antennas by performing phase shift on one basic code sequence, performing a data processing by allocating the generated pilot symbol sequences to a plurality of subcarriers and transmitting them via the transmitting antennas, respectively.

Figure 18:
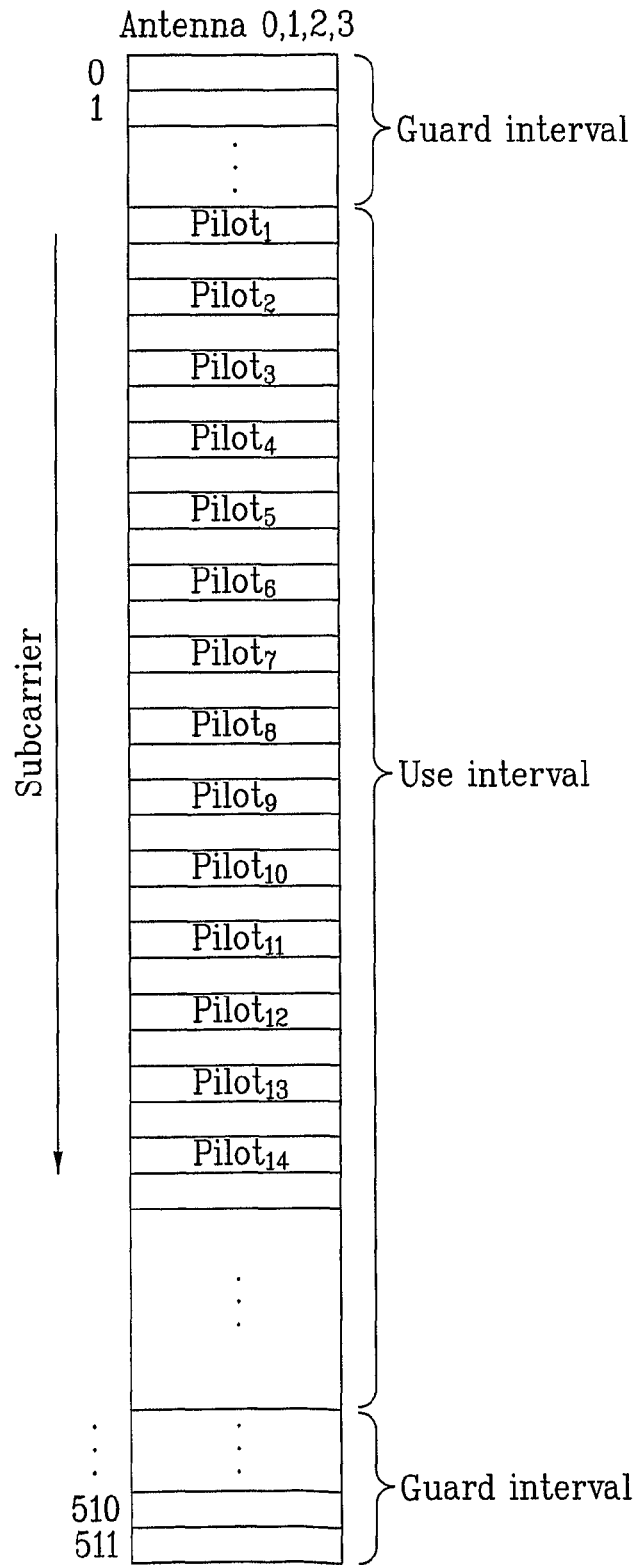
FIG. 18 is a diagram to explain a method of generating a pilot symbol sequence and a method of allocating a generated pilot symbol sequence to a subcarrier according to a third embodiment of the present invention.

FIG. 18 is a diagram for explaining a third embodiment. In FIG. 18, four pilot symbol sequences are generated by shifting a phase of each symbol of a basic code sequence to configure a preamble or midamble transmitted via four transmitting antennas and each of the pilot symbol sequences is allocated to a subcarrier at the same position.

In generating a plurality of pilot symbol sequences from the basic code sequence, a receiving side should perform a phase shift to minimize interference between signals received by the antennas, respectively. A phase shift in a frequency domain works as a delay in a time domain. Namely, a plurality of pilot symbol sequences are generated from an identical basic code sequence by applying different phase shifts to transmitting antennas, respectively, each of the generated pilot symbol sequences is mapped to a subcarrier to go through an IFFT process, and the mapped sequences are then transmitted via the transmitting antennas, respectively. If so, signals transmitted via the transmitting antennas are separated from each other with a predetermined time interval each to be received by a receiving side. Hence, the receiving side is able to separate each of the per-transmitting-antenna signals through filtering. Yet, each of the per-transmitting-antenna signals has a side lobe waveform due to left and right guards existing in an OFDM symbol, multi-path fading in the course of signal transmission, thermal noise of a receiver and the like. A side robe of the per-transmitting-antenna signal works as interference on a signal of another antenna. So, it is preferable that a plurality of pilot symbol sequences are generated from the basic code sequence by applying a phase shift capable of minimizing antenna-to-antenna interference.

Formula 7 shows an example of a phase shift method capable of generating each pilot symbol of each pilot symbol sequence from one basic code sequence using phase shift orthogonality.

$$Pilot_p = a_p e^{-j2\pi np(P/N_t)/P} \quad \text{[Formula 7]}$$
$$= a_p e^{-j2\pi np/N_t}$$

In this case, $a_p$ is a basic code sequence and corresponds to −1, −1, +1, +1, +1, +1, +1, −1, −1, +1, −1, . . . , for example. n is an index of a transmitting antenna and corresponds to n=0, 1, . . . , ($N_t$−1). P is the total number of pilot symbols. p is an index of a pilot symbol and corresponds to p=0, 1, . . . , (P−1). And, Ni is the total number of transmitting antennas. According to Formula 7, it is able to generate all symbols of each pilot symbol sequence. And, orthogonality exists between neighboring symbols.

According to the third embodiment, it is able to transmit the same number of pilot symbols for one transmitting antenna all the time by allocating the pilot symbols to a subcarrier at a same position regardless of increment of the number of transmitting antennas. Namely, in FIG. 18, the number of pilot symbols included in a preamble or midamble transmitted via each transmitting antenna and a position of a subcarrier to which allocated are identical.

Figure 19A:
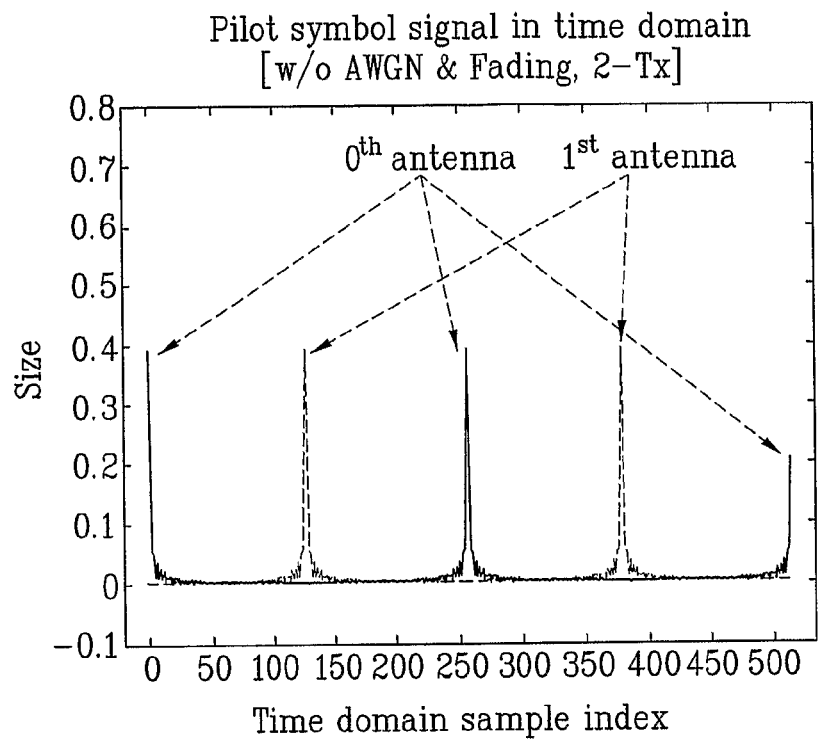
FIGS. 19A to 20B are diagrams of signals received by a receiving side under various conditions in transmitting a pilot symbol of the third embodiment of the present invention.
Figure 19B:
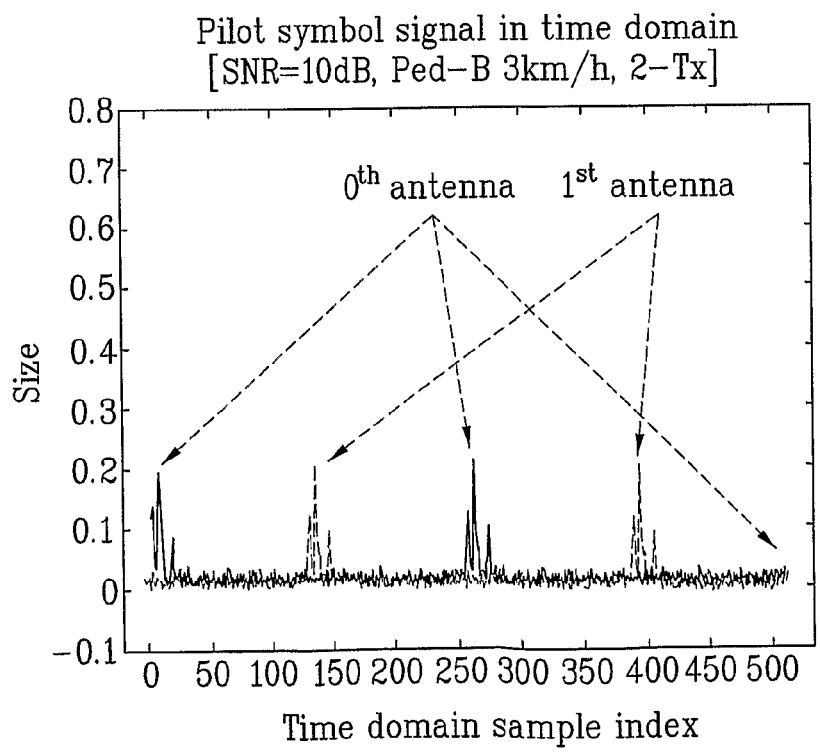

FIG. 19A and FIG. 19B show waveforms of a signal received by a receiving side in a time domain in case of generating two pilot symbol sequences from a basic code sequence by phase shift according to the method of Formula 7, allocating the generated sequences to subcarriers shown in FIG. 18, performing data processing on the allocated sequences and transmitting the data-processed signals via two transmitting antennas. In FIG. 19A, it is assumed that right and left guard intervals exist on an OFDM symbol and that multi-path fading and receiver's thermal noise do not exist. In FIG. 19B, it is assumed that there exist right and left guard intervals, multi-path fading and receiver's thermal noise.

Figure 20A:
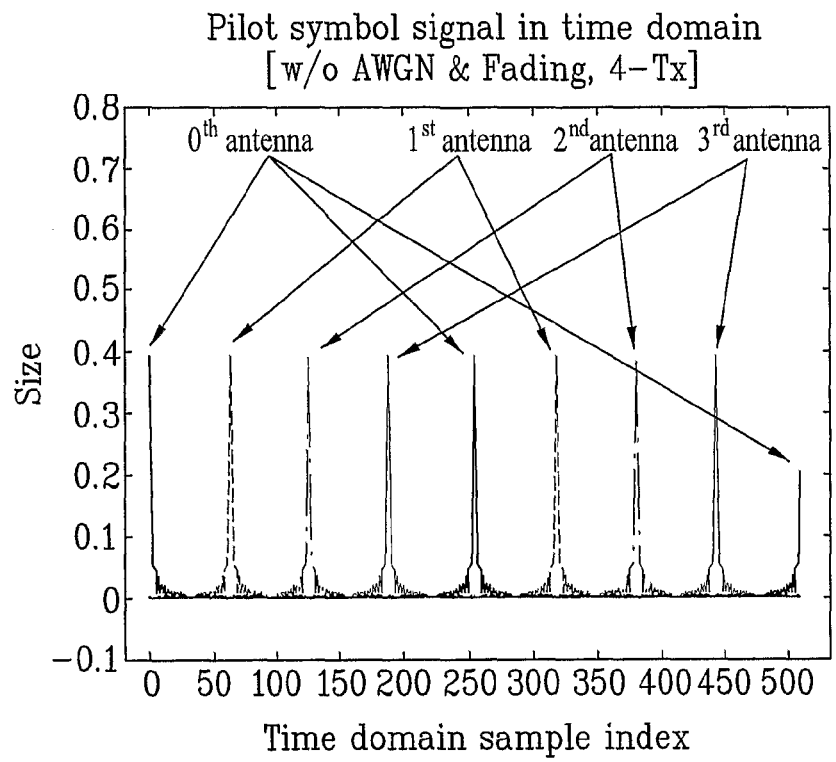
Figure 20B:
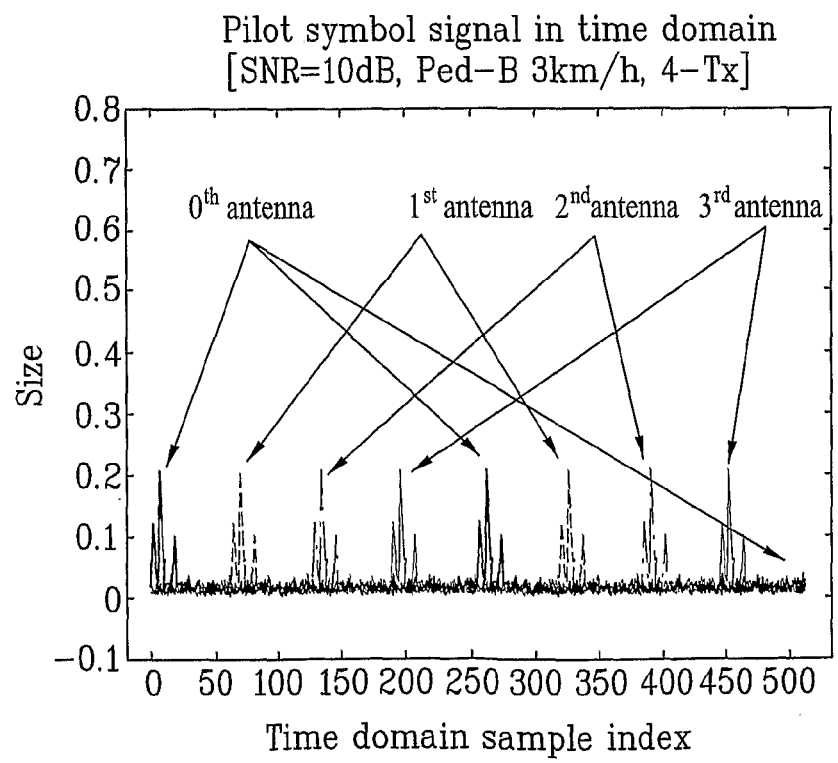

FIG. 20A and FIG. 20B show waveforms of a signal received by a receiving side in a time domain in case of generating four pilot symbol sequences from a basic code sequence by phase shift according to the method of Formula 7, allocating the generated sequences to subcarriers shown in FIG. 18, performing data processing on the allocated sequences and transmitting the data-processed signals via four transmitting antennas. In FIG. 20A, it is assumed that right and left guard intervals exist on an OFDM symbol and that multi-path fading and receiver's thermal noise do not exist. In FIG. 20B, it is assumed that there exist right and left guard intervals, multi-path fading and receiver's thermal noise.

Referring to FIGS. 19A to 20B, despite that a side lobe exists due to right and left guard intervals, multi-path fading and receiver's thermal noise, a receiving side is able to extract a specific signal only through filtering per antenna and perform a channel estimation or sync acquisition work using one OFDM symbol interval in a multi-antenna environment.

Figure 21:
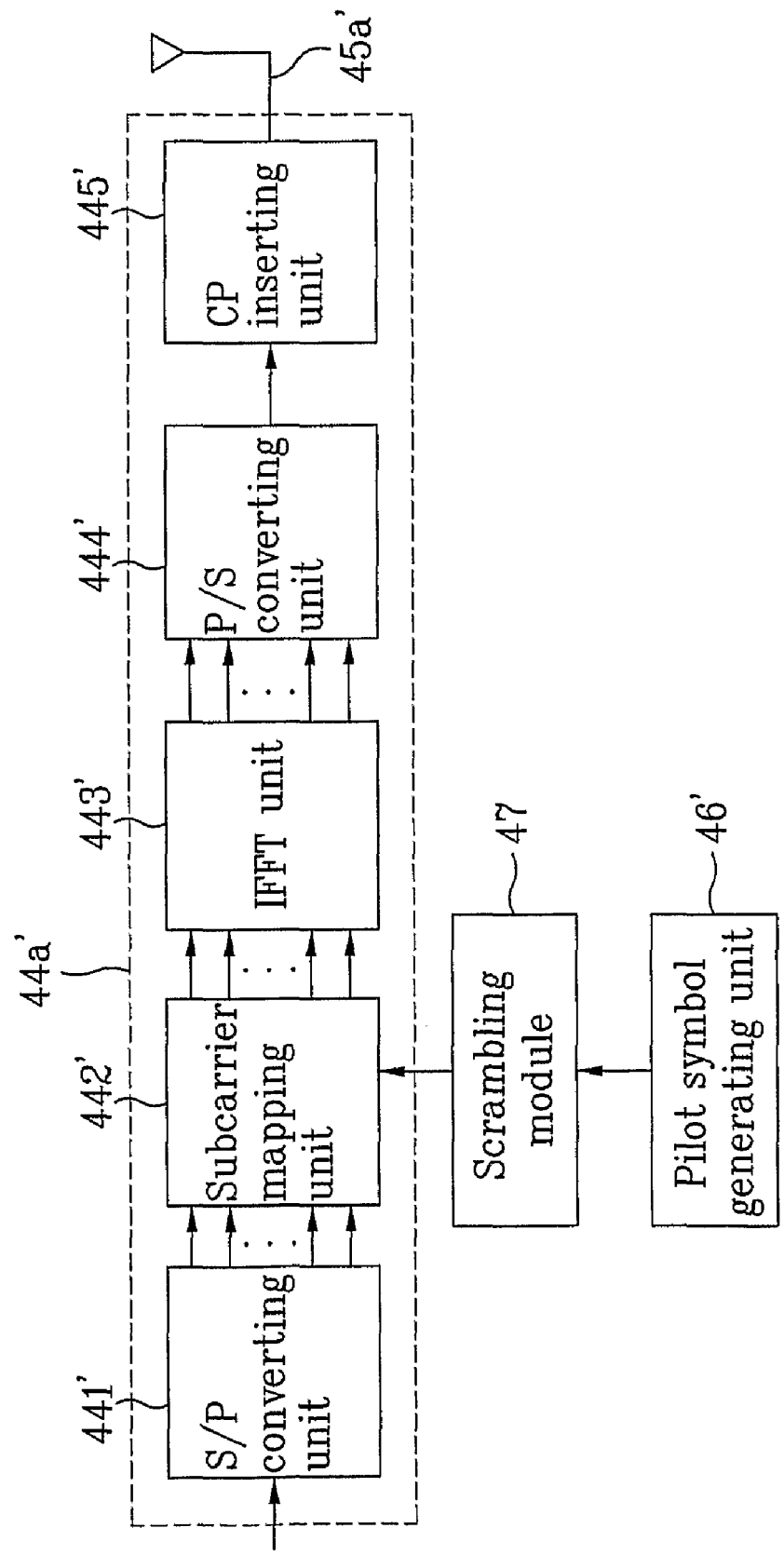
FIG. 21 is a block diagram of a transmitter according to another preferred embodiment of the present invention.

FIG. 21 is a block diagram of a transmitter according to another preferred embodiment of the present invention, in which a detailed configuration of one OFDM data processing module 44a' connected to a specific transmitting antenna 45a' in a transmitting system using multi-transmitting antenna is shown. Compared to FIG. 4B, FIG. 21 is characterized in that a scrambling module 47 is added between a pilot module generating module 46' and a subcarrier mapping unit 442'.

Referring to FIG. 21, the pilot symbol generating module 46' provides one pilot symbol sequence to each OFDM data processing module 44a' by generating a plurality of pilot symbol sequences corresponding to the number of transmitting antennas in a manner of phase-shifting one basic code sequence (e.g., applying Formula 7). As mentioned in the foregoing description, instead of generating pilot symbol sequences each signal transmission, the pilot symbol generating module 46' is able to store a plurality of previously generated pilot symbol sequences and output them if necessary. The scrambling module 47 performs scrambling in a manner of multiplying a pilot symbol sequence outputted from the pilot symbol generating module 46' by a scrambling code having a random characteristic.

The pilot symbol sequence is scrambled via the scrambling module 47. This is to reduce PAPR (peak-to-average power ratio). In other words, in case of the pilot symbol sequence generated according to Formula 7, a value having an amplitude '1' is mapped to all pilot symbols in a frequency domain. So, a considerably large peak value is generated if the corresponding signal is converted to a time-domain signal through IFFT. To remove this phenomenon, PAPR can be enhanced by scrambling a pilot symbol sequence through a random scrambling code effective in aspect of PAPR performance.

A receiving side, which has received a signal transmitted through the transmitted shown in FIG. 21, performs descrambling in a manner of multiplying the received signal by the scrambling code used by the scrambling module 47 again to eliminate the scrambling code. Hence, the receiving side obtains an original pilot symbol sequence. Yet, since the signal received by the receiving side needs to undergo a filtering process for separating each per-antenna signal in a time domain before being converted to a signal of a frequency domain, descrambling should be performed prior to the filtering process.

Since multiplication in a frequency domain is the same calculation of circular convolution in a time domain, the same effect of removing a scrambling code on a frequency domain can be obtained if circular convolution is carried out on a signal of a time domain of a scrambling code and a signal received by a receiving side prior to FFT. This can be expressed as Formula 8.

$$F^{-1}[X_k \times S_k] \leftrightarrow x_n \otimes s_n \quad \text{[Formula 8]}$$

In this case, $F^{-1}$ is an inverse Fourier transform, $\otimes$ is circular convolution, k is subcarrier index in a frequency domain, $X_k$ is a $k^{th}$ pilot symbol in a frequency domain, $S_k$ is a $k^{th}$ scrambling code in a frequency domain, n is a sample index in a time domain, $x_n$ is an $n^{th}$ data symbol in a time domain, and $s_n$ is an nth scrambling code in a time domain.

According to the technical features of the present invention, a receiving side is able to efficiently perform signal tracking and acquisition for initial signal detection, time and frequency synchronization, channel estimation and the like through pilot symbol transmission via a preamble or midamble in an MIMI multiple carriers communication system. According to the present invention, estimation of an independent channel variation occurring between transmitting and receiving sides in each antenna is possible by transmitting a pilot symbol per antenna in an MIMI multiple carriers communication system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to a wireless communication system that performs communications using multi-antenna and multiple carriers.

The invention claimed is:

1. A method of transmitting a reference signal in an Orthogonal Frequency Division Multiplexing (OFDM) communication system using a plurality of antennas, the method comprising:
generating a basic code sequence;
generating a plurality of reference signal sequences for the plurality of antennas by multiplying the basic code sequence by an orthogonal code, wherein the plurality of reference signal sequences include a first reference signal sequence for a first antenna and a second reference signal sequence for a second antenna;
allocating each of the plurality of reference signal sequences to predetermined OFDM symbols and predetermined subcarriers, wherein the first reference signal sequence and the second reference signal sequence are allocated to same OFDM symbols and same subcarriers; and
transmitting each of the plurality of reference signal sequences via the allocated OFDM symbols and subcarriers.

2. The method of claim 1, wherein the orthogonal code is an Alamouti code or a Hadamard code.

3. The method of claim 1, wherein assuming that an $n^{th}$ symbol of the basic code sequence is represented as $x_n$ (n=0, 1, 2, 3, ...), $n^{th}$ symbols of the reference signal sequences allocated to first and second OFDM symbols of the first and second antennas are $x_n$, $x_n^*$, $x_n$ and $-x_n^*$, respectively.

4. The method of claim 3, wherein a symbol interval of the reference signal sequence allocated to the first OFDM symbol of either of the first or second antenna is twice greater than a symbol-to-symbol interval in case of transmitting the basic code sequence via a single transmitting antenna.

5. The method of claim 4, wherein each symbol of the reference signal sequence allocated to the second OFDM symbol of either the first or second antenna is allocated between symbols of the reference signal sequence allocated to the first OFDM symbol of the first or second antenna on a frequency axis.

6. The method of claim 4, wherein the reference signal sequences allocated to the first and second OFDM symbols of $2(m+1)^{th}$ and $\{2(m+1)+1\}^{th}$ antennas (m=0, 1, 2, 3, ...) are allocated to subcarriers resulting from shifting each of the reference signal sequences allocated to the first and second OFDM symbols of $2m^{th}$ and $(2m+1)^{th}$ antennas by one subcarrier interval on a frequency axis.

7. The method of claim 4, wherein the reference signal sequence allocated to the first OFDM symbol of a $2(m+1)^{th}$ antenna is allocated to a same subcarrier of the reference signal sequence allocated to the first OFDM symbol of a $2m^{th}$ antenna.

8. The method of claim 7, wherein symbols of the reference signal sequences allocated to the second OFDM symbol of the first and second antennas are respectively allocated between symbols of the reference signal sequences allocated to the first OFDM symbol of the first and second antennas on a frequency axis.

9. The method of claim 8, wherein the reference signal sequence allocated to the second OFDM symbol of a $\{2(m+1)+1\}^{th}$ antenna is allocated by shifting the reference signal sequence allocated to the second OFDM symbol of a $(2m+1)^{th}$ antenna by one subcarrier on the frequency axis.

10. The method of claim 1, further comprising: converting each of the reference signal sequences to time domain signals; and
inserting a guard interval using a cyclic prefix (CP) in a prefix converted to the time domain signals.

11. The method of claim 10, wherein if there is an overlapped part in one of the time-domain signals in which the guard interval is inserted, a portion of the one of the time-domain signals is transmitted via each of a plurality of the transmitting antennas.

12. The method of claim 10, wherein inserting the guard interval comprises inserting the guard interval in both a first OFDM symbol and a second OFDM symbol.

13. The method of claim 10, wherein inserting the guard interval comprises insertinq the guard interval in a first OFDM symbol only.

14. The method of claim 1, wherein the plurality of reference signal sequences are generated by shifting a phase of the basic code sequence differently.

15. The method of claim 14, wherein each symbol of a plurality of the reference signal sequences is determined by using an equation defined as:

$$Pilot_p = a_p e^{-j2\pi np(P/N_t)/P}$$
$$= a_p e^{-j2\pi np/N_t},$$

where $a_p$ is the basic code sequence, n is an index of a transmitting antenna corresponding to n=0, 1, ..., $(N_t-1)$, p is an index of a pilot symbol corresponding to p=0, 1, ..., (P-1), and $N_t$ is the total number of transmitting antennas.

16. The method of claim 15, wherein corresponding symbols of the plurality of reference signal sequences are respectively allocated to identical subcarriers.

17. The method of claim 14, further comprising scrambling each of the plurality of reference signal sequences by a specific scrambling code.

18. An apparatus for transmitting a reference signal in an Orthogonal Frequency Division Multiplexing (OFDM) communication system using a plurality of antennas, the apparatus comprising:
a sequence generating module configured to:
generate a basic code sequence, and
generate a plurality of reference signal sequences for the plurality of antennas by multiplying the basic code sequence by an orthogonal code, wherein the plurality of reference signal sequences include a first reference signal sequence for a first antenna and a second reference signal sequence for a second antenna,
a subcarrier allocating module configured to allocate each of the plurality of reference signal sequences to predetermined OFDM symbols and predetermined subcarriers, wherein the first reference signal sequence and the second reference signal sequence are allocated to same OFDM symbols and same subcarriers, and .
a transmitting module configured to transmit each of the plurality of reference signal sequences via the allocated OFDM symbols and subcarriers.

19. The apparatus of claim 18, wherein the orthogonal code is Alamouti code or Hadamard code.

20. The apparatus of claim 18, wherein assuming that an $n^{th}$ symbol of the basic code sequence is represented as $x_n$ (n=0, 1, 2, 3, ...), $n^{th}$ symbols of the reference signal sequences allocated to first and second OFDM symbols of first and second antennas are $x_n$, $x_n^*$, $x_n$ and $-x_n^*$, respectively.

21. The apparatus of claim 18, further comprising a data processing module comprising:
an IFFT unit converting each of the plurality of reference signal sequences to time domain signals; and a cyclic prefix (CP) inserting unit inserting a guard interval using the CP in a prefix converted to the time domain signals.

22. The apparatus of claim 18, wherein the plurality of reference signal sequences are generated by shifting a phase of the basic code sequence differently.

23. The apparatus of claim 22, wherein each symbol of a plurality of the reference signal sequences is determined by using an equation defined as:

$$Pilot_p = a_p e^{-j2\pi np(P/N_t)/P}$$
$$= a_p e^{-j2\pi np/N_t},$$

where $a_p$ is a basic code sequence, n is an index of a transmitting antenna to correspond to n=0, 1, ..., ($N_t$−1), p is an index of a pilot symbol to correspond to p=0, 1, ..., (P−1), and $N_t$ is the total number of transmitting antennas.

24. The apparatus of claim 23, wherein corresponding symbols of the plurality of reference signal sequences are respectively allocated to identical subcarriers.

25. The apparatus of claim 22, further comprising a scrambling module scrambling each of the plurality of reference signal sequences by a specific scrambling code.

* * * * *